United States Patent
Gotoh et al.

(10) Patent No.: US 6,209,515 B1
(45) Date of Patent: Apr. 3, 2001

(54) INTERNAL COMBUSTION ENGINE, CONTROLLER AND METHOD

(75) Inventors: Masato Gotoh, Susono; Shizuo Sasaki; Kouji Yoshizaki, both of Numazu; Takekazu Ito, Suntougun; Hiroki Murata, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/348,282

(22) Filed: Jul. 7, 1999

(30) Foreign Application Priority Data

| Jul. 15, 1998 | (JP) | 10-200651 |
| Jul. 21, 1998 | (JP) | 10-205046 |
| Jul. 29, 1998 | (JP) | 10-214300 |
| Aug. 19, 1998 | (JP) | 10-233110 |
| Aug. 20, 1998 | (JP) | 10-234653 |
| Sep. 2, 1998 | (JP) | 10-248644 |
| Sep. 25, 1998 | (JP) | 10-271615 |
| Sep. 30, 1998 | (JP) | 10-278269 |
| Oct. 14, 1998 | (JP) | 10-292186 |
| Oct. 15, 1998 | (JP) | 10-294034 |
| Oct. 20, 1998 | (JP) | 10-298614 |
| Oct. 21, 1998 | (JP) | 10-299882 |
| Nov. 11, 1998 | (JP) | 10-320927 |

(51) Int. Cl.$^7$ ............... F02D 41/38; F02B 3/06
(52) U.S. Cl. ............ 123/305; 123/568.21; 60/274; 60/276; 60/285
(58) Field of Search ................ 123/305, 480, 123/672, 689, 568.11, 568.17, 568.19, 568.16, 568.21, 568.26, 568.31; 701/108; 60/276, 278, 285, 298, 301

(56) References Cited

U.S. PATENT DOCUMENTS

| 5,890,360 | 4/1999 | Sasaki et al. ................ 60/278 |
| 5,937,639 | * 8/1999 | Sasaki et al. ................ 60/278 |
| 5,979,398 | * 11/1999 | Yanagihara ................ 123/299 |
| 6,053,144 | * 4/2000 | Greenwood et al. ........ 123/294 |
| 6,055,968 | * 5/2000 | Sasaki et al. ............. 123/568.21 |

FOREIGN PATENT DOCUMENTS

| 0921285 | * 6/1999 | (EP) . |
| 0947685 | * 10/1999 | (EP) . |
| 0972925 | * 1/2000 | (EP) . |

\* cited by examiner

*Primary Examiner*—Tony M. Argenbright
*Assistant Examiner*—Hieu T. Vo
(74) *Attorney, Agent, or Firm*—Oliff & Berridge, PLC

(57) ABSTRACT

A stable combustion without generating smoke or misfire is performed by selectively conducting a first combustion mode and a second combustion mode. In the first combustion mode, an amount of an inert gas, e.g., EGR gas, provided to a combustion chamber is made to be larger than an amount of the inert gas that causes the generation amount of soot to become a peak amount. This causes substantially no soot to be generated. In the second combustion mode, the amount of the inert gas provided to the combustion chamber is made to be smaller than the amount that causes the generation amount of soot to become a peak amount. The injection timing is quickened if the injection amount is increased in the first combustion mode, and the injection timing is delayed if the injection amount is reduced.

34 Claims, 22 Drawing Sheets

INTERNAL COMBUSTION ENGINE, CONTROLLER AND METHOD

INCORPORATION BY REFERENCE

The disclosure of each of Japanese Patent Applications, No. HEI 10-233110 filed on Aug. 19, 1998, No. HEI 10-200651 filed on Jul. 15, 1998, No. HEI 10-278269 filed on Sep. 30, 1998, No. HEI 10-214300 filed on Jul. 29, 1998, No. HEI 10-205046 filed on Jul. 21, 1998, No. HEI 10-271615 filed on Sep. 25, 1998, No. HEI 10-234653 filed on Aug. 20, 1998, No. HEI 10-248644 filed on Sep. 2, 1998, No. HEI 10-299882 filed on Oct. 21, 1998, No. HEI 10-292186 filed on Oct. 14, 1998, No. HEI 10-298614 filed on Oct. 20, 1998, No. HEI 10-294034 filed on Oct. 15, 1998 and No. HEI 10-320927 filed on Nov. 11, 1998, including the specifications, drawings and abstracts, is incorporated herein by reference in their entirety.

BACKGROUND OF THE INVENTION

1. Field of Invention

The present invention relates to an internal combustion engine having a combustion chamber into which inert gas is introduced so as to cause combustion.

2. Description of Related Art

Conventionally, in an internal combustion engine, for example, in a diesel engine, in order to restrict the generation of NOx, an engine exhaust passage and an engine intake passage are connected by exhaust gas recirculation (hereinafter, refer to EGR) so as to recirculate exhaust gas, that is, EGR gas into the engine intake passage via the EGR passage. In this case, since the EGR gas has a relatively high specific heat and accordingly can absorb a large amount of heat, the combustion temperature within the combustion chamber is lowered as an amount of the EGR gas is increased, that is, a rate of the EGR (EGR gas amount/(EGR gas amount+intake air amount)) is increased. When the combustion temperature is lowered, the generation amount of NOx is lowered, so that the greater the EGR rate is increased, the less the generation amount of NOx becomes.

As mentioned above, it has been conventionally known that the generation amount of NOx can be lowered when the EGR rate is increased. However, in the case where the EGR rate is increased, the generation amount of soot, that is, smoke suddenly starts increasing when the EGR rate is over a certain limit. With respect to this point, it has been conventionally considered that the smoke is unlimitedly increased when the EGR rate is increased further, so that it has been considered that the EGR rate at which the smoke suddenly starts increasing is the maximum allowable value of the EGR rate.

Accordingly, the EGR rate has been conventionally defined to stay within a range which is not over the maximum allowable limit. The maximum allowable limit of the EGR rate is significantly different in correspondence to a type of the engine and a fuel, however, is within a range between about 30% and 50%. Therefore, in the conventional diesel engine, the EGR rate is restricted to a range in which about 30% and 50% is the maximum.

As mentioned above, since it has been conventionally considered that the maximum allowable limit exists with respect to the EGR rate, the EGR rate has been defined within the range which does not exceed the maximum allowable limit and so that the generation amount of smoke becomes as little as possible. However, even when the EGR rate is defined so that the generation amount of NOx and smoke becomes as small as possible, a reduction of the generation amount of NOx and smoke has a limit. In fact, the generation of a considerable amount of NOx is inevitable.

SUMMARY OF THE INVENTION

In the process of researching combustion in the diesel engine, it has been found that when making the EGR rate greater than the maximum allowable limit, the smoke is suddenly increased as mentioned above. However, the generation amount of the smoke has a peak, and when further increasing the EGR rate over the value at which the peak occurs, smoke suddenly starts reducing at this time, so that when setting the EGR rate to a value equal to or more than 70% at a time of an idling operation or strongly cooling the EGR gas, the smoke becomes substantially 0, that is, the soot is hardly generated when setting the EGR rate to the value equal to or more than 55%. Further, it has been found that the generation amount of NOx becomes a significantly small amount at this time.

Thereafter, on the basis of this information, a consideration has been performed with respect to the reason why the soot is not generated. As a result, a new combustion system recently has been obtained that can simultaneously reduce the soot and NOx. The new combustion system will be described in detail below. In summary, it is based on a principle that the growth of a hydrocarbon is stopped in the middle of the process by which the hydrocarbon grows into soot.

That is, it has been ascertained as a result of many experiments and much research that the growth of the hydrocarbon stops in the middle of the process before becoming soot when the temperature of the fuel and the surrounding gas at a time of combustion within the combustion chamber is equal to or less than a certain temperature, and that the hydrocarbon grows into soot at a stroke when the temperature of the fuel and the surrounding gas reach a certain temperature. In this case, the temperature of the fuel and the surrounding gas is greatly influenced by an endothermic effect of the gas surrounding the fuel at a time when the fuel is burned, so that it is possible to control the temperature of the fuel and the surrounding gas by adjusting the heat absorption amount of the gas surrounding the fuel in correspondence to the generation amount at a time of the combustion of the fuel.

Accordingly, when restricting the temperature of the fuel and the surrounding gas at a time of combustion within the combustion chamber to the level equal to or less than the temperature at which the growth of the hydrocarbon stops, soot is not generated. Thus, it is possible to restrict the temperature of the fuel and the surrounding gas at a time of combustion within the combustion chamber to a level equal to or less than the temperature at which the growth of the hydrocarbon stops by adjusting the heat absorption amount of the gas surrounding the fuel. On the contrary, the hydrocarbon whose growth has been stopped before becoming soot can be easily purified by an after treatment using an oxidation catalyst or the like. This is a basic principle of the new combustion system.

In the new combustion system, the fuel injection timing at which stable combustion can be obtained is limited to a relatively narrow range of a crank angle. That is, when the fuel injection timing is quickened, the injected fuel is heated by the compressed high temperature gas for a long time, so that the temperature of the fuel and the surrounding gas becomes high at a time of combustion. As a result, since a hydrocarbon grows to soot, smoke is generated. On the contrary, when the fuel injection timing is delayed, the temperature of the injected fuel is not increased as much. Most of the fuel, thus, is not burned, leading to misfire.

In this new combustion system, there exists an optimum range of a crank angle at which a stable combustion can be obtained in a state where no smoke is generated and no misfire is generated with respect to the fuel injection timing. Accordingly, it is necessary to perform fuel injection at the optimum range of the crank angle in the new combustion system.

However, the optimum range of the crank angle at which the stable combustion can be obtained is changed in accordance with a value of a parameter for operating an engine which influences a temperature of a fuel and a surrounding gas at a time of burning within a combustion chamber, for example, an air fuel ratio, an EGR rate, a temperature of an intake gas flowing within the combustion chamber and the like.

For example, as the temperature of the intake gas flowing to the combustion chamber becomes higher, the temperature of the gas within the combustion chamber becomes higher, so that the temperature of the injected fuel is increased. In this case, in order to prevent smoke from being generated, it is necessary to shorten the heating time of the injected fuel due to the gas within the combustion chamber such that the temperature of the intake gas is increased. In order to achieve this, it is necessary to delay the fuel injection timing as the temperature of the intake gas is increased.

On the contrary, as the temperature of the intake gas flowing within the combustion chamber becomes lower, the temperature of the gas within the combustion chamber becomes lower, reducing the temperature of the injected fuel. In this case, in order to prevent misfire, it is necessary to lengthen the heating time of the injected fuel due to the gas within the combustion chamber such that the temperature of the intake gas is reduced. In order to achieve this, it is necessary to quicken the fuel injection timing as the temperature of the intake gas is reduced.

As mentioned above, the optimum range of the crank angle with respect to the fuel injection is changed in accordance with the value of the operation parameter of the engine which influences the temperature of the fuel and the surrounding gas at a time of burning within the combustion chamber.

However, even when determining the fuel injection timing within the optimum range of the crank angle by taking the operation parameter of the engine into consideration, an amount of the air supplied within the combustion chamber is not changed in accordance with the change in the injection amount when the injection amount is changed, leading to smoke or misfire.

That is, in the new combustion system, when the injection amount is increased, the amount of the intake air is increased in accordance therewith. The EGR rate at this time is controlled to the level equal to or more than the fixed value at which no soot is generated. That is, when the injection amount is increased, the opening degree of the throttle valve or the opening degree of the EGR control valve, for example, is controlled so that the amount of the intake air is increased and the EGR rate becomes the fixed value or greater. When the injection amount is increased, the amount of the fuel supplied within the combustion chamber is immediately increased, however, the amount of the intake air supplied within the combustion chamber is not immediately increased due to a delay of an operation of the throttle valve or the EGR control valve, and is increased only after a time delay. Accordingly, when the injection amount is increased, the air fuel ratio becomes rich in comparison with a target air fuel ratio.

In this case, under the new combustion system, the combustion chamber is filled with a large amount of inert gas, and the air is dispersed into (mixed with) the inert gas. The injected fuel is brought into contact with the air dispersed into the inert gas and is burned. Accordingly, when the air fuel ratio is reduced, that is, the fuel amount is increased with respect to the air amount, much time is required until all the injected fuel is brought into contact with the air. Therefore, as mentioned above, when the air fuel ratio becomes rich, all the fuel can not be brought into contact with the air unless the injection timing is quickened, resulting in misfire.

Under the new combustion system, when the injection amount is reduced, the amount of intake air is reduced. However, actually, even when the injection amount is reduced, due to the operation delay of the throttle valve or the EGR control valve, the amount of intake air supplied to the combustion chamber is not immediately reduced. Then the air fuel ratio becomes lean in comparison with the target air fuel ratio. When the air fuel ratio becomes lean in comparison with the target air fuel ratio, that is, the amount of air is increased in comparison with the fuel, the combustion is strongly performed. Accordingly, in this case, the combustion pressure becomes high unless the injection timing is delayed, leading to the increase in the temperature of combustion and generation of smoke.

As mentioned above, even when determining the injection timing within the optimum range of the crank angle while taking the operation parameter of the engine into consideration, misfire is generated or smoke is generated unless the injection timing is not corrected when the injection amount is changed.

An object of the present invention is to perform a stable combustion in which no smoke is generated and no misfire is generated.

In order to achieve the above object, in accordance with one aspect of the present invention, there is provided an internal combustion engine controller for use with an engine in which the generation amount of soot is gradually increased to a peak amount when increasing an amount of an inert gas supplied within a combustion chamber. The engine controller: controls an amount of an intake air supplied within the combustion chamber; controls an amount of an inert gas so as to make an amount of the inert gas supplied within the combustion chamber more than the amount of the inert gas that causes the generation amount of soot to become a peak amount; determines an injection amount and a timing for injecting a fuel within the combustion chamber in accordance with an operation state of the engine; and adjusts the fuel injection timing when the fuel injection amount is changed.

Accordingly, it is possible to obtain a stable combustion in which no smoke is generated and no misfire is generated.

BRIEF DESCRIPTION OF THE DRAWINGS

The invention will be described in conjunction with the following drawings in which like reference numerals designate like elements and wherein:

FIGS. 11A and 11B are views which show maps of a target opening degree of the throttle valve and the like;

FIGS. 15A and 15B are views which show maps of a target opening degree of the throttle valve and the like;

DETAILED DESCRIPTION OF PREFERRED EMBODIMENTS

Figure 1:
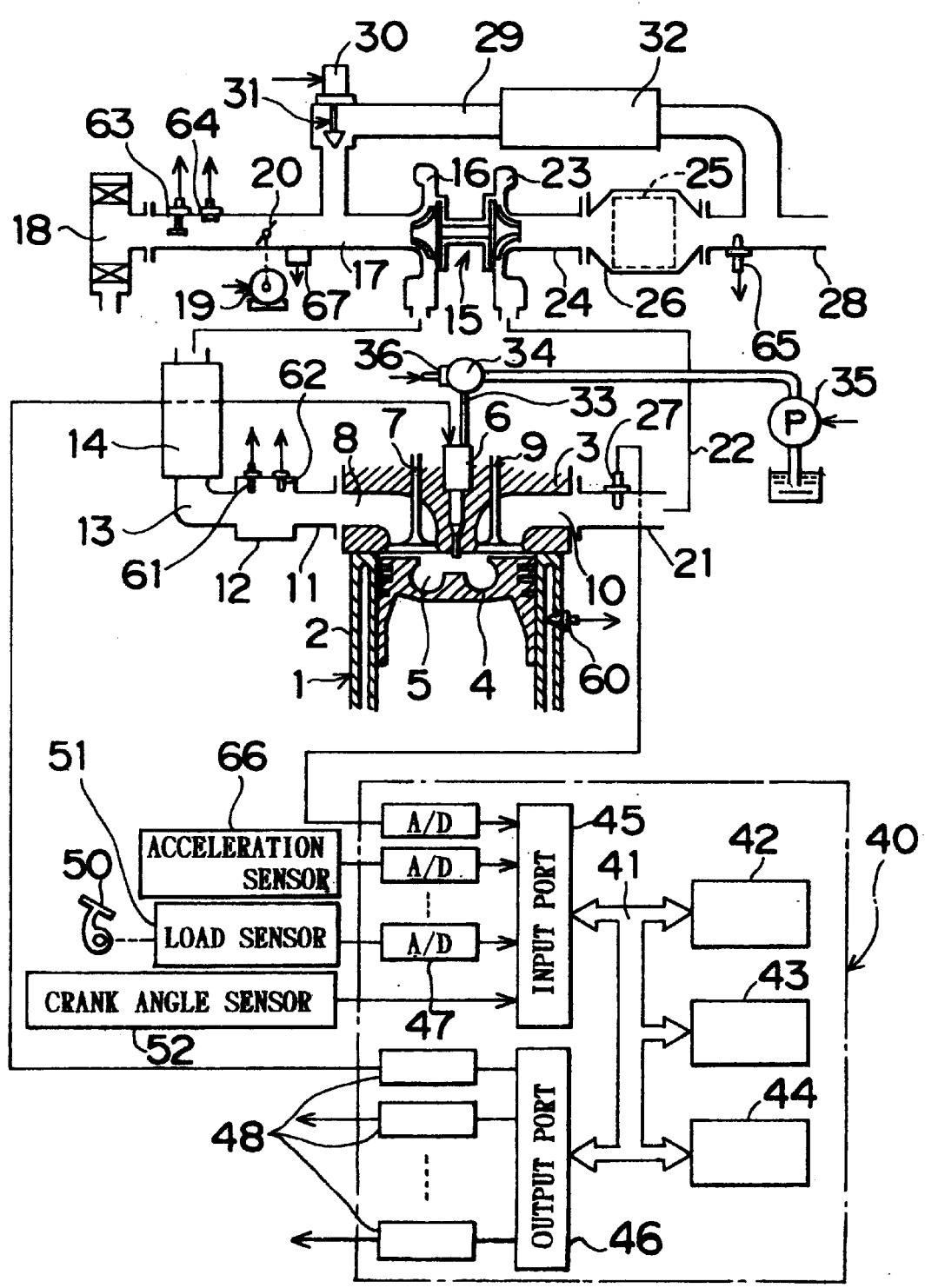
FIG. 1 is a total view of a compression ignition type internal combustion engine in accordance with an embodiment of the present invention.

FIG. 1 shows a case in which the present invention is applied to a 4-stroke compression ignition type internal combustion engine.

With reference to FIG. 1, reference numeral 1 denotes a main body of an engine, reference numeral 2 denotes a cylinder block, reference numeral 3 denotes a cylinder head, reference numeral 4 denotes a piston, reference numeral 5 denotes a combustion chamber, reference numeral 6 denotes an electrically controlled type fuel injection valve, reference numeral 7 denotes an intake valve, reference numeral 8 denotes an intake port, reference numeral 9 denotes an exhaust valve, and reference numeral 10 denotes an exhaust port, respectively. The intake port 8 is connected to a surge tank 12 via a corresponding intake branch pipe 11, and the surge tank 12 is connected to a supercharger, for example, an outlet portion of a compressor 16 of an exhaust turbo charger 15 via an intake duct 13 and an inter cooler 14. An inlet portion of the compressor 16 is connected to an air cleaner 18 via an air intake pipe 17, and a throttle valve 20 driven by a step motor 19 is arranged within the air intake pipe 17. A throttle valve position sensor 67 for detecting a full close position of the throttle valve 20 is arranged adjacent to the throttle valve 20 so as to be used for learning a full close position of the throttle valve.

The learning (or calibration) of the full close position of the throttle valve will be briefly described below. The full close position is the position that the throttle valve assumes when the engine is stopped. Although the throttle valve should be fully closed at a time of an engine stop, it is usually slightly open by a small amount. Subsequently, the negative pressure of the suction pipe caused by the cranking is generated, and this causes the throttle valve to be changed the position of the throttle valve as smaller. The full close position of the throttle valve can be learned on the basis of the output signal of the throttle valve position sensor 67 for detecting the full close position of the throttle valve 20 before the negative pressure in the suction pipe caused by the cranking is generated. By using sensor 67, the throttle valve full close position can be accurately learned at a time when the throttle valve is fully closed and before the negative pressure in the suction pipe caused by the cranking is generated. Accordingly, the actual throttle opening degree can be accurately made to coincide with the target throttle opening degree. Accordingly, the actual intake air amount can be accurately made to coincide with the target intake air amount.

The exhaust port 10 is connected to an inlet portion of an exhaust turbine 23 of the exhaust turbo charger 15 via an exhaust manifold 21 and an exhaust pipe 22, and an outlet portion of the exhaust turbine 23 is connected to a catalytic converter 26 containing a catalyst 25 having an oxidation function therewithin via an exhaust pipe 24. A catalyst temperature sensor 65 for detecting a temperature of an exhaust gas which is used for calculating a temperature of a catalyst 25 is arranged within the exhaust pipe 24 disposed in a downstream side of the catalytic converter 26. An air fuel ratio sensor 27 is arranged within the exhaust manifold 21.

An exhaust pipe 28 connected to an outlet portion of the catalytic converter 26 and the air intake pipe 17 disposed downstream of the throttle valve 20 are connected to each other via an EGR passage 29, and an EGR control valve 31 driven by a step motor 30 is arranged within the EGR passage 29. Further, an inter cooler 32 for cooling an EGR gas flowing within the EGR passage 29 is arranged within the EGR passage 29. In the embodiment shown in FIG. 1, an engine cooling water is introduced into the inter cooler 32, and the EGR gas is cooled by the engine cooling water.

The fuel injection valve 6 is connected to a fuel reservoir, a so called common rail 34, via a fuel supply pipe 33. Fuel is supplied into the common rail 34 from an electrically controlled type fuel pump 35 in which a discharge amount is variable, and the fuel supplied into the common rail 34 is supplied to the fuel injection valve 6 via the fuel supply pipe 33. A fuel pressure sensor 36 for detecting a fuel pressure within the common rail 34 is mounted thereto. A discharge amount of the fuel pump 35 can be controlled so that the fuel pressure within the common rail 34 becomes a target fuel pressure on the basis of an output signal of the fuel pressure sensor 36.

An electronic control unit 40 (i.e., a controller) is constituted by a digital computer, and is provided with a read only memory (ROM) 42, a random access memory (RAM) 43, a microprocessor (CPU) 44, an input port 45 and an output port 46 mutually connected by a two way bus 41. A water temperature sensor 60 for detecting a temperature of an engine cooling water is arranged in the engine main body 1, and an output signal of the water temperature sensor 60 is input to the input port 45 via a corresponding AD converter 47. A pressure sensor 61 for detecting an absolute pressure within the surge tank 12 and a temperature sensor 62 for detecting a temperature of a mixed gas between the intake air and the EGR gas are arranged in the surge tank 12. Output signals of the pressure sensor 61 and the temperature sensor 62 are respectively input to the input port 45 via the corresponding AD converter 47. Further, output signals of the air fuel ratio sensor 27 and the catalyst temperature sensor 65 are respectively input to the input port 45 via the corresponding AD converter 47. Still further, an acceleration sensor 66, which generates an output pulse at every 360 degrees rotation of the cam shaft, is connected to the input port 45 via an AD converter 47. An angular velocity of the engine at a stroke including an expansion stroke in each of the cylinders is detected on the basis of the output signals of a crank angle sensor 52 and the acceleration sensor 66.

A mass flow amount detecting device 63 for detecting a mass flow amount of the intake air and a humidity sensor 64 for detecting a humidity of the intake air are arranged within the air intake pipe 17 disposed upstream of the throttle valve 20. The mass flow amount detecting device 63, the throttle valve position sensor 67 and the humidity sensor 64 are respectively input to the input port 45 via a corresponding AD converter 47. Further, an output signal of the fuel pressure sensor 36 is input to the input port 45 via a corresponding AD converter 47. A load sensor 51 for generating an output voltage in proportional to a depression amount L of the accelerator pedal 50 is connected to the acceleration pedal 50. An output voltage of the load sensor 51 is input to the input port 45 via a corresponding AD converter 47. The crank angle sensor 52 for generating an output pulse every time when the crank shaft rotates, for example, at 30 degrees, is connected to the input port 45. The output port 46 is connected to the fuel injection valve 6, the throttle valve controlling the step motor 19, the EGR control valve controlling the step motor 30 and the fuel pump 35 via respective drivers 48.

Figure 2:
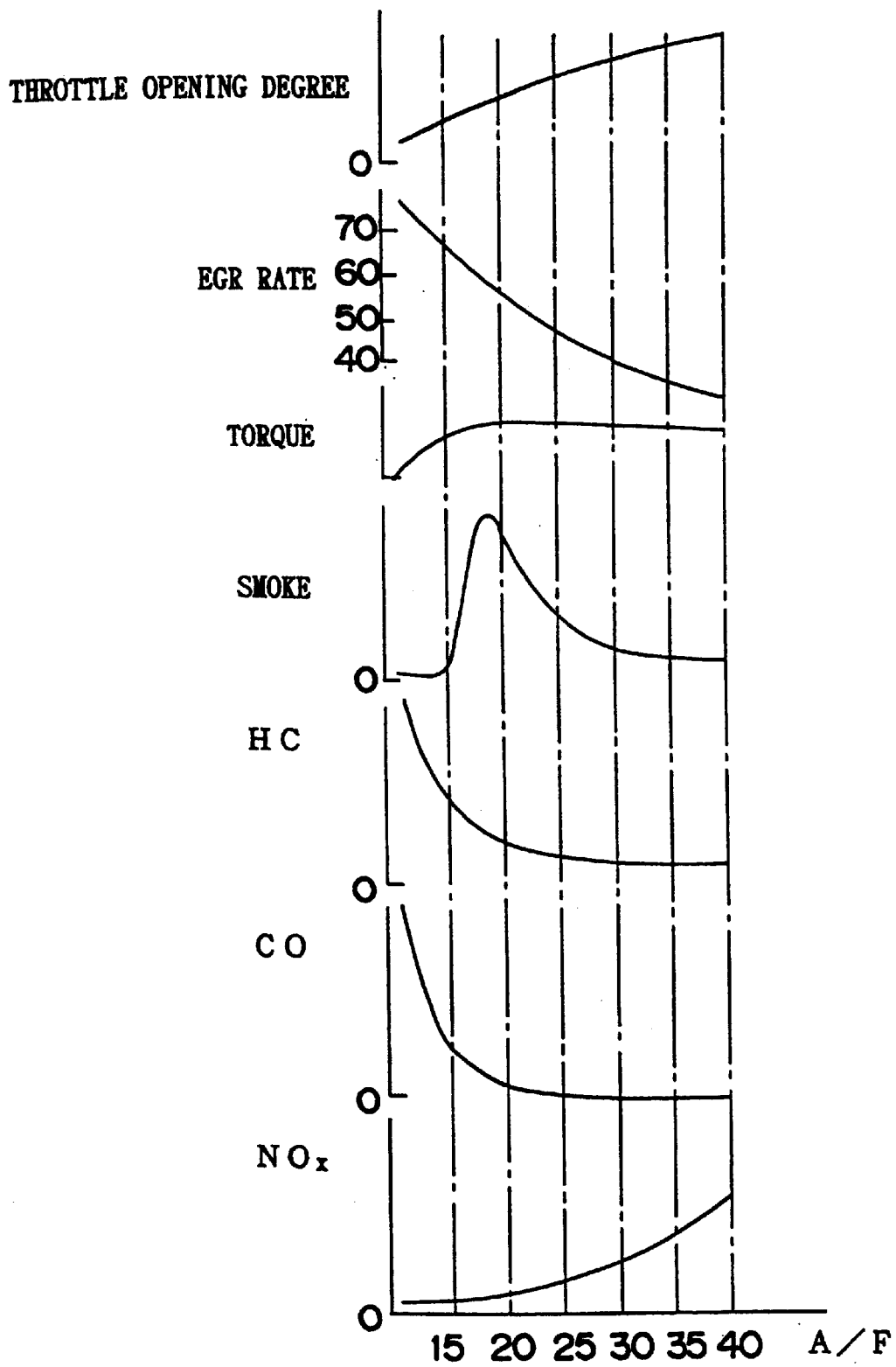
FIG. 2 is a graph which shows the change in the amount of smoke, HC, CO and NOx corresponding to the change in an output torque and an air fuel ratio.

FIG. 2 illustrates an experimental embodiment which shows a change in an output torque and a change in a discharge amount of smoke, HC, CO and NOx when changing an air fuel ratio A/F (a horizontal axis in FIG. 2) by changing an opening degree of the throttle valve 20 and the EGR rate at a time of operating the engine under a low load. As can be understood from FIG. 2, in this experimental embodiment, the smaller the air fuel ratio A/F becomes, the greater the EGR rate is, and the EGR rate becomes equal to or more than 65% when the air fuel ratio is equal to or less than the stoichiometric air fuel ratio (~14.6).

As shown in FIG. 2, in the case of making the air fuel ratio A/F smaller by increasing the EGR rate (reading the FIG. 2 chart from right-to-left), the generation amount of the smoke starts increasing when the EGR rate becomes near 40% and the air fuel ratio A/F becomes about 30%. Next, when further increasing the EGR rate and making the air fuel ratio A/F smaller, the generation amount of the smoke is suddenly increased to a peak. Next, when further increasing the EGR rate and making the air fuel ratio A/F even smaller, the smoke is suddenly reduced at this time, and when the air fuel ratio A/F becomes near 15.0 while setting the EGR rate to a value equal to or more than 65%, the smoke is substantially 0. That is, soot is hardly generated. At this time, the output torque of the engine is slightly reduced and the generation amount of NOx is significantly reduced. On the contrary, a generation amount of HC and CO starts increasing at this time.

Figure 3A:
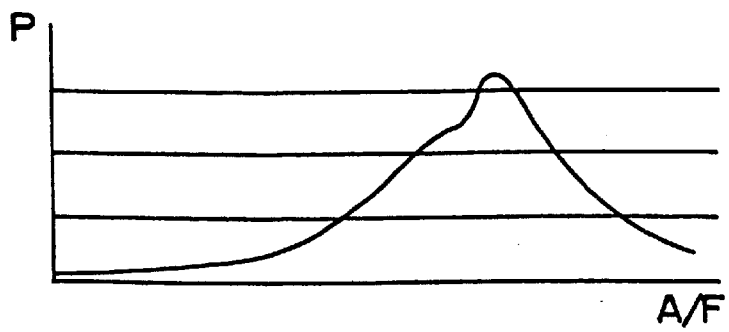
FIGS. 3A and 3B are graphs which show combustion pressure.
Figure 3B:
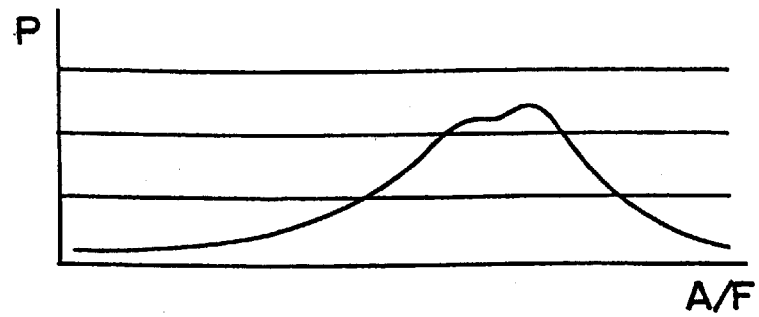

FIG. 3A shows a change of a combustion pressure within the combustion chamber 5 when the air fuel ratio A/F is near 21 and the generation amount of smoke is the largest. FIG. 3B shows the change in a combustion pressure within the combustion chamber 5 when the air fuel ratio A/F is near 18 and the generation amount of smoke is substantially 0. As can be understood from comparison between FIGS. 3A and 3B, the combustion pressure in the case shown in FIG. 3B where the generation amount of smoke is substantially 0 is lower than that shown in FIG. 3A where the generation amount of smoke is large.

The following results can be determined from the experimental results shown in FIGS. 2 and 3. That is, at first, when the air fuel ratio A/F is equal to or less than 15.0 and the generation amount of smoke is substantially 0, the generation amount of NOx is significantly reduced as shown in FIG. 2. The reduction of the generation amount of NOx means that the combustion temperature within the combustion chamber 5 has been reduced. It is known that the combustion temperature within the combustion chamber 5 becomes low when soot is hardly generated. The same can be said from FIG. 3. That is, in a state shown in FIG. 3B where soot is hardly generated, the combustion pressure becomes low, so that the combustion temperature within the combustion chamber 5 becomes low.

Figure 4:
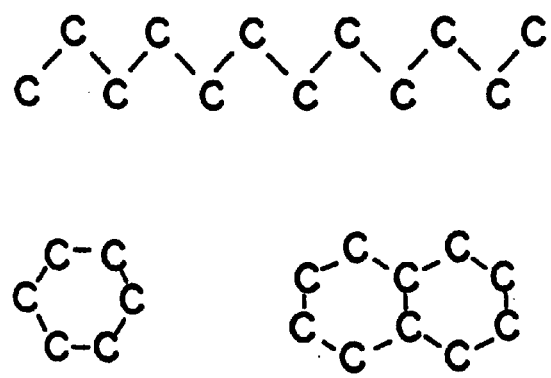
FIG. 4 is a view which shows a molecule of a fuel.

Secondly, when the generation amount of smoke, that is, the generation amount of soot becomes substantially 0, the discharge amount of HC and CO is increased as shown in FIG. 2. This means that hydrocarbon is discharged without growing into soot. That is, in a straight chain hydrocarbon or an aromatic hydrocarbon shown in FIG. 4 and contained in the fuel, when the temperature is increased in an oxygen poor state, a precursor of soot is formed due to a thermal decomposition, and soot containing a solid substance mainly formed by an aggregation of carbon atoms is produced. In this case, a process of actually producing soot is complex and it is uncertain what aspect the precursor of soot forms. However, in any event, the hydrocarbon shown in FIG. 4 grows into soot after first growing into a precursor of soot. Accordingly, as mentioned above, when the generation amount of soot becomes substantially 0, the discharge amount of HC and CO is increased as shown in FIG. 2, however, HC at this time corresponds to the precursor of soot or the hydrocarbon in the preceding state.

Putting in order the considerations on the basis of the experimental results shown in FIGS. 2 and 3, when the combustion temperature within the combustion chamber 5 is low, the generation amount of soot becomes substantially 0, so that the precursor of soot or the hydrocarbon in the preceding state (prior to growing into the soot precursor) is discharged from the combustion chamber 5. As a result of performing further experiments and research with respect to the matter in detail, it becomes clear that the growing process of soot stops, that is, no soot is generated, in the case where the temperature of the fuel and the surrounding gas within the combustion chamber 5 is equal to or less than a certain temperature, and that soot is generated when the temperature of the fuel and the surrounding gas within the combustion chamber 5 is equal to or greater than a certain temperature.

Additionally, the temperature of the fuel and the surrounding gas when the growing process of the hydrocarbon stops in a state of the precursor of soot, that is, the certain temperature as mentioned above, changes due to various factors such as a kind of the fuel, a compression ratio of the air fuel ratio and the like. At present, the specific value of the temperature cannot be specified. However, the certain temperature has a great relation to the generation amount of NOx, so that the certain temperature can be defined from the generation amount of NOx at a certain level. That is, as the EGR rate is increased, the temperature of the fuel and the surrounding gas at a time of combustion is reduced. Accordingly, the generation amount of NOx is reduced. At this time, soot is hardly generated when the generation amount of NOx becomes near 10 p.p.m. or less. Accordingly, the certain temperature mentioned above substantially coincides with the temperature when the generation amount of NOx approximates to the value around 10 p.p.m. or less.

Once being generated, soot can not be purified by an after treatment using the catalyst having an oxidation function. On the contrary, the precursor of soot or the hydrocarbon in the preceding state can be easily purified in accordance with the after treatment using the catalyst having an oxidation function. As mentioned above, considering the after treatment by the catalyst having an oxidation function, there is a significantly great difference between the case of discharging the hydrocarbon from the combustion chamber 5 as the precursor of soot or the preceding state, and the case of discharging the hydrocarbon from the combustion chamber 5 as soot. The new combustion system employed in the present invention is mainly structured to discharge the hydrocarbon from the combustion chamber 5 as the precursor of soot or as the preceding state without generating soot within the combustion chamber 5 and to oxidize the hydrocarbon by the catalyst having the oxidation function.

Further, in order to stop the growth of the hydrocarbon in the state prior to the generation of soot (i.e., as the precursor), it is necessary to restrict the temperature of the fuel and the surrounding gas at a time of the combustion within the combustion chamber 5 to a temperature lower than the temperature at which soot is generated. In this case, it is clearly understood that an endothermic effect of the gas around the fuel during burning affects the restriction of the temperature of the fuel and the surrounding gas by a significantly great amount.

That is, when only air exists around the fuel, the evaporated fuel immediately reacts with oxygen in the air so as to be burned. In this case, the temperature of the air apart from the fuel is not increased much; only the temperature around the fuel becomes locally increased in a significant manner.

That is, at this time, the air apart from the fuel hardly performs an endothermic effect of the combustion heat in the fuel. In this case, since the combustion temperature becomes locally high in a significant manner, the unburned hydrocarbon to which the combustion heat is applied generates soot.

On the contrary, in the case where the fuel exists in the mixed gas containing a large amount of inert gas and a small amount of air, the condition is slightly different. In this case, the evaporated fuel diffuses to the periphery and reacts with oxygen contained in the inert gas in a mixed manner so as to burn. In this case, since the combustion heat is absorbed into the peripheral inert gas, the combustion temperature is not increased much. Thus, it is possible to restrict the combustion temperature to a low level. That is, in order to restrict the combustion temperature, an existence of the inert gas performs an important part, so that it is possible to restrict the combustion temperature to a low level due to the endothermic effect of the inert gas.

In this case, in order to restrict the temperature of the fuel and the surrounding gas to a temperature lower than the temperature at which soot is generated, the inert gas amount sufficient for absorbing sufficient heat is necessary. Accordingly, when the fuel amount increases, the necessary inert gas amount increases in accordance therewith. Here, in this case, the greater the specific heat of the inert gas, the stronger the endothermic effect, so that a gas having a great specific heat is preferable for use as the inert gas. In view of this point, since $CO_2$ and the EGR gas have a relatively great specific heat, it is preferable to employ the EGR gas as the inert gas.

Figure 5:
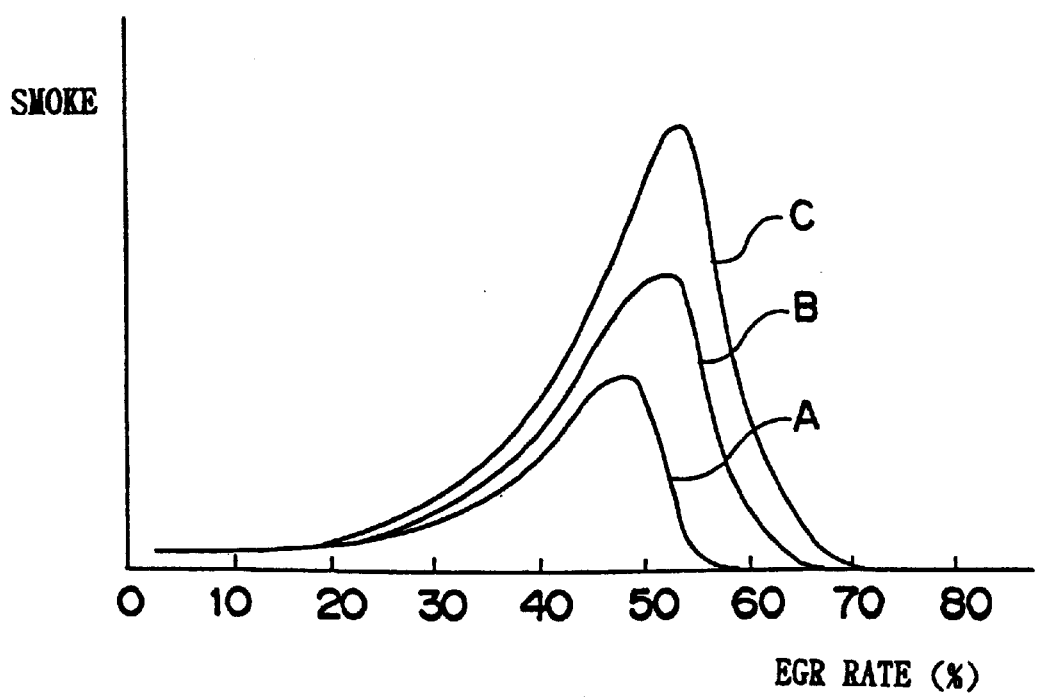
FIG. 5 is a graph which shows a relation between a generation amount of smoke and EGR rate.

FIG. 5 shows a relation between the EGR rate and smoke when using the EGR gas as the inert gas and changing the cooling degree of the EGR gas. In FIG. 5, curve A shows a case of strongly cooling the EGR gas so as to maintain the EGR gas temperature to substantially 90° C., curve B shows a case of cooling the EGR gas by a compact cooling apparatus and curve C shows a case of not forcibly cooling the EGR gas.

As shown by the curve A in FIG. 5, in the case of strongly cooling the EGR gas, the generation amount of soot becomes peak when the EGR rate is slightly lower than 50%, and in this case, soot is hardly generated when setting the EGR rate to the level equal to or more than substantially 55%.

On the contrary, as shown by the curve B in FIG. 5, in the case of cooling the EGR gas slightly, the generation amount of soot becomes peak when the EGR rate is slightly higher than 50%, and in this case, soot is hardly generated when setting the EGR rate to the level equal to or more than substantially 65%.

Further, as shown by the curve C in FIG. 5, in the case of not forcibly cooling the EGR gas, the generation amount of soot becomes peak when the EGR rate is near 55%, and in this case, soot is hardly generated when setting the EGR rate to the level equal to or more than substantially 70%.

In this case, FIG. 5 shows a generation amount of smoke when the engine load is comparatively high. When the engine load becomes small, the EGR rate at which the generation amount of soot becomes peak is slightly reduced, and the lower limit of the EGR rate at which soot is hardly generated is slightly reduced. As mentioned above, the lower limit of the EGR rate at which soot is hardly generated changes in correspondence to a cooling degree of the EGR gas and the engine load.

Figure 6:
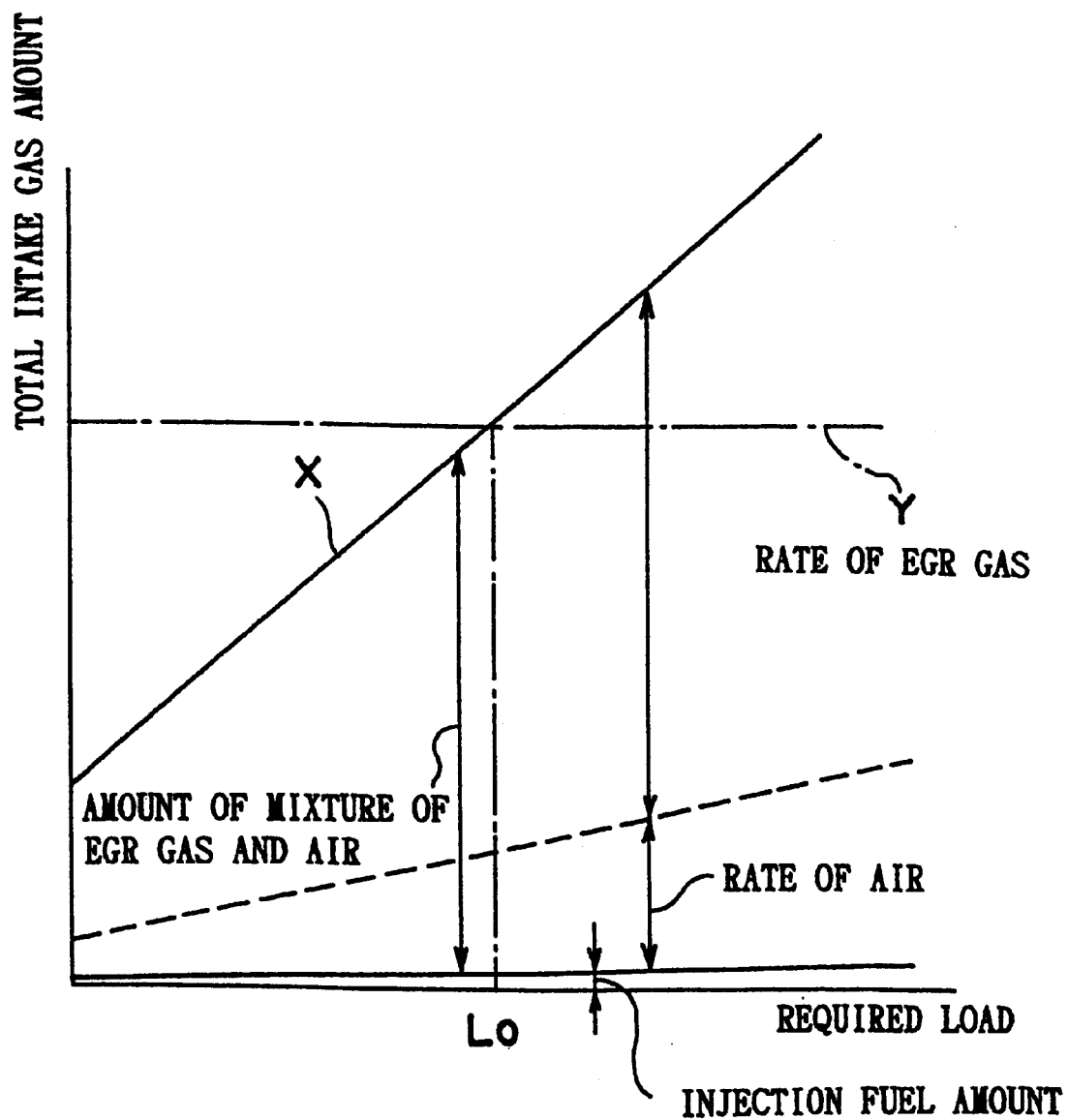
FIG. 6 is a graph which shows a relation between a total amount of intake gas and required load.

FIG. 6 shows a mixed gas amount of the EGR gas and air necessary for making the temperature of the fuel and the surrounding gas at a time of combustion in the case of employing the EGR gas for the inert gas lower than the temperature at which soot is generated, a rate of air in the mixed gas, and a rate of the EGR gas in the mixed gas. In FIG. 6, the vertical axis shows a total intake gas amount admitted within the combustion chamber 5, and a chain line Y shows a total intake gas amount capable of being admitted within the combustion chamber 5 when supercharging is not performed. Further, the horizontal axis shows the required load.

With reference to FIG. 6, the rate of air, that is, the air amount in the mixed gas shows the amount of the air necessary for completely burning the injected fuel. That is, in the case shown in FIG. 6, the ratio of the air amount to the injection fuel amount corresponds to the stoichiometric air fuel ratio. On the contrary, in FIG. 6, the rate of the EGR gas, that is, the EGR gas amount in the mixed gas shows the minimum EGR gas amount necessary for setting the temperature of the fuel and the surrounding gas to the temperature lower than the temperature at which soot is formed when the injected fuel is burned. The EGR gas amount is equal to or more than 55% in terms of the EGR rate, and that of the embodiment shown in FIG. 6 is equal to or more than 70%. That is, when setting the total intake gas amount admitted into the combustion chamber 5 to a solid line X in FIG. 6 and setting the ratio of the air amount to the EGR gas amount among the total intake gas amount X to the ratio as shown in FIG. 6, the temperature of the fuel and the surrounding gas becomes lower than the temperature at which soot is generated, and accordingly no soot is generated. Further, the generation amount of NOx at this time is approximately 10 p.p.m. or less, so that the generation amount of NOx is significantly small.

Since the amount of heat generated when the fuel is burned is increased with an increase in the fuel injection amount, in order to maintain the temperature of the fuel and the surrounding gas to the temperature lower than the temperature at which soot is generated, it is necessary to increase the absorption amount of the heat due to the EGR gas. Accordingly, as shown in FIG. 6, the EGR gas amount should be increased in accordance with the increase in the injection fuel amount. That is, the EGR gas amount should be increased as the required load becomes high.

Here, in the case where supercharging is not performed, the upper limit of the amount X of the total intake gas admitted into the combustion chamber 5 is Y. In FIG. 6, in an area having the required load larger than $L_0$, the air fuel ratio can not be maintained to the stoichiometric air fuel ratio unless the EGR gas rate is reduced as the required load becomes greater. In other words, in the case where the air fuel ratio is intended to be maintained to the stoichiometric air fuel ratio in the area having the desired load larger than $L_0$ while supercharging is not performed, the EGR rate is reduced as the required load becomes high. Accordingly, in the area at the desired load larger than $L_0$, it is impossible to maintain the temperature of the fuel and the surrounding gas to the value lower than the temperature at which soot is produced.

However, as shown in FIG. 1, when recirculating the EGR gas into the inlet side of the supercharger, that is, the air intake pipe 17 of the exhaust turbo charger 15 via the EGR passage 29, in the area at the required load larger than $L_0$, it is possible to maintain the EGR rate to the level equal to or more than 55%, for example, 70%. Accordingly, the temperature of the fuel and the surrounding gas can be maintained to the value lower than the temperature at which soot is produced. That is, when recirculating the EGR gas so that the EGR rate within the air intake pipe 17 becomes, for example, 70%, the EGR rate of the intake gas at the pressure boosted by the compressor 16 of the exhaust turbo charger 15 also becomes 70%. It is, thus, possible to maintain the temperature of the fuel and the surrounding gas to the temperature at which soot is produced as long as the compressor 16 is allowed to perform boosting. Accordingly, it is possible to expand the operation range of the engine which can produce the low temperature combustion.

In this case, when setting the EGR rate to the level equal to or more than 55% in the area at the required load larger than $L_0$, the EGR control valve 31 is fully opened and the throttle valve 20 is slightly closed.

As mentioned above, FIG. 6 shows combustion of the fuel at the stoichiometric air fuel ratio. Even when setting the air amount to be less than the air amount shown in FIG. 6, that is, setting the air fuel ratio to the rich side, it is possible to restrict the generation amount of NOx to approximately 10 p.p.m. or less while restricting soot generation. Further, even when setting the air amount to be larger than the air amount shown in FIG. 6, that is, setting the average value of the air fuel ratio to a lean value ranging from 17 to 18, it is possible to restrict the generation amount of NOx to approximately 10 p.p.m. or less while restricting soot generation.

When the air fuel ratio is made rich, the fuel becomes excessive. However, since the combustion temperature is restricted to be low, the excessive fuel does not grow into soot, thus generating no soot. Further, at this time, only a significantly small amount of NOx is produced. On the contrary, when the average air fuel ratio is lean, or even when the air fuel ratio becomes the stoichiometric air fuel ratio, a small amount of soot is generated at high combustion temperature. However, in accordance with the present invention, since the combustion temperature is restricted to be low, no soot is generated. Further, only a small amount of NOx is generated.

As mentioned above, when low temperature combustion is performed, soot is not generated irrespective of the air fuel ratio. That is, regardless of whether the air fuel ratio becomes rich or the stoichiometric air fuel ratio, or the average air fuel ratio becomes lean, only a small amount of NOx is generated. Accordingly, in view of improving the specific fuel consumption, it is preferable to set the average air fuel ratio to lean.

In this case, the temperature of the fuel and the surrounding gas during combustion within the combustion chamber can be restricted to the level equal to or less than the temperature at which the growth of the hydrocarbon stops halfway (as a precursor to soot) only in the engine operation at the middle or low load at which the amount of heat generated during combustion is relatively small. Accordingly, in the embodiment in accordance with the present invention, during the engine operation at middle or low load, the temperature of the fuel and the surrounding gas during combustion is restricted to the temperature equal to or less than the temperature at which the growth of the hydrocarbon stops as a precursor so as to perform the first combustion (or first combustion mode), that is, the low temperature combustion. During the engine operation at high load, the second combustion (or second combustion mode), that is, the conventionally performed combustion is performed. In this case, the first combustion mode, that is, the low temperature combustion represents the combustion mode in which the amount of inert gas within the combustion chamber is greater than that of the inert gas at which the generation amount of soot becomes a peak amount, and soot is hardly generated, as is apparent from the explanation above. The second combustion mode, that is, the conventionally performed combustion represents a combustion mode in which the amount of inert gas within the combustion chamber is smaller than that of inert gas at which the generation amount of soot becomes the peak amount. (The words "first" and "second" are only meant to distinguish between the two combustion modes, and are not meant to limit the order in which the modes occur.)

Figure 7:
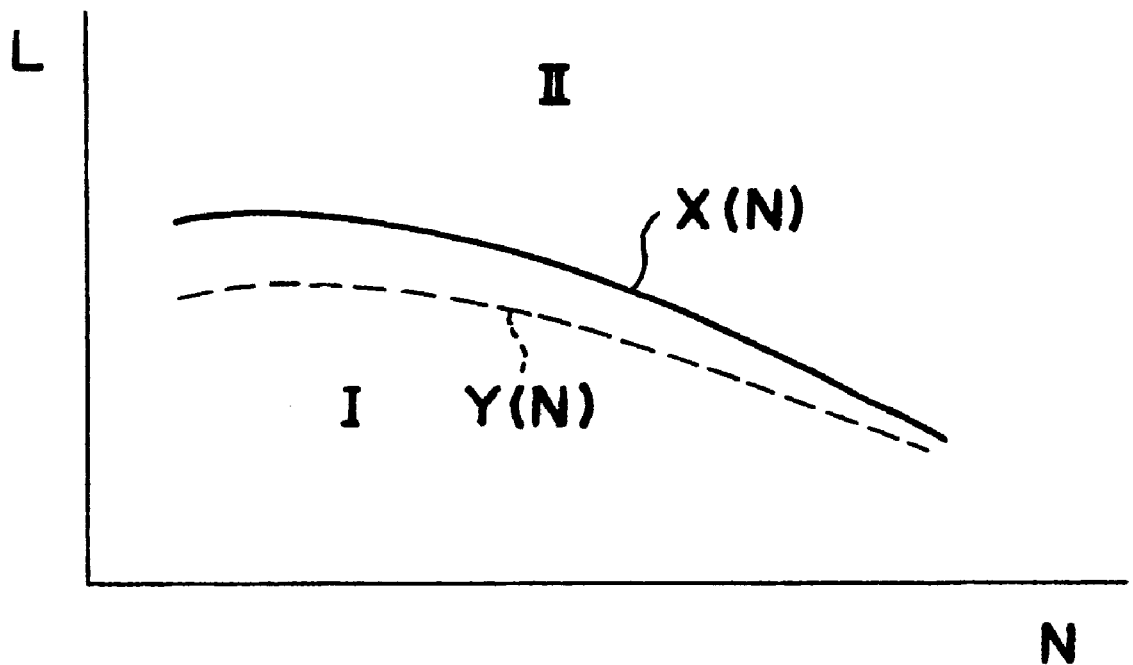
FIG. 7 is a graph which shows a first operation area I (where the engine operates in a first combustion mode) and a second operation area II (where the engine operates in a second combustion mode)

FIG. 7 shows a first operation area I in which the first combustion mode, that is, the low temperature combustion is performed and a second operation area II in which the second combustion mode, that is, the combustion in accordance with the conventional combustion method is performed. In this case, in FIG. 7, the vertical axis L indicates the depression amount of the acceleration pedal 50, that is, the required load, and the horizontal axis N indicates the engine speed. Further, in FIG. 7, X(N) shows a first boundary between the first operation area I and the second operation area II, and Y(N) shows a second boundary between the first operation area I and the second operation area II. A change in the operation area from the first operation area I to the second operation area II is determined on the basis of the first boundary X(N), and a change in the operation area from the second operation area II to the first operation area I is determined on the basis of the second boundary Y(N).

That is, when the required load L exceeds the first boundary X(N) corresponding to a function of the engine speed N when the operation state of the engine is in the first operation area I and the low temperature combustion is performed, it is determined that the operation area has been moved to the second operation area II where the combustion in accordance with the conventional combustion method is performed. Next, when the required load L becomes lower than the second boundary Y(N) corresponding to a function of the engine speed N, it is determined that the operation area has been moved to the first operation area I where the low temperature combustion is performed again.

As mentioned above, two boundaries including the first boundary X(N) and the second boundary Y(N) at the load lower than the first boundary X(N) are provided for the following two reasons. First, since the combustion temperature is relatively higher at the high load in the second operation area II, the low temperature combustion can not be immediately performed even when the required load L is lower than the first boundary X(N). That is, the low temperature combustion can be started only when the required load L is made significantly low, i.e., lower than the second boundary Y(N). Second, a hysteresis is provided in accordance with the change in the operation area between the first operation area I and the second operation area II.

In this case, when the engine operation state exists in the first operation area I where the low temperature combustion is performed, soot is hardly generated, and in place thereof, unburned hydrocarbon is discharged from the combustion chamber 5 as the precursor of soot or the state prior thereto. At this time, the unburned hydrocarbon discharged from the combustion chamber 5 is well oxidized by the catalyst 25 having an oxidization function.

As the catalyst 25, an oxidation catalyst, a three way catalyst or an NOx absorbent can be employed. The NOx absorbent has a function of absorbing NOx when the average air fuel ratio within the combustion chamber 5 is lean and discharging NOx when the average air fuel ratio within the combustion chamber 5 becomes rich.

The NOx absorbent is formed of an alumina carrier and at least one selected from an alkaline metal such as potassium K, sodium Na, lithium Li and cesium Cs, an alkaline earth metal such as barium Ba and calcium Ca and a rare earth metal such as lanthanum La and yttrium Y, and a noble metal such as platinum Pt, which are carried on the carrier.

In addition to the oxidation catalyst, the three way catalyst and the NOx absorbent have the oxidation function. Therefore, as mentioned above, the three way catalyst and the NOx absorbent can be used as the catalyst 25.

Figure 8:
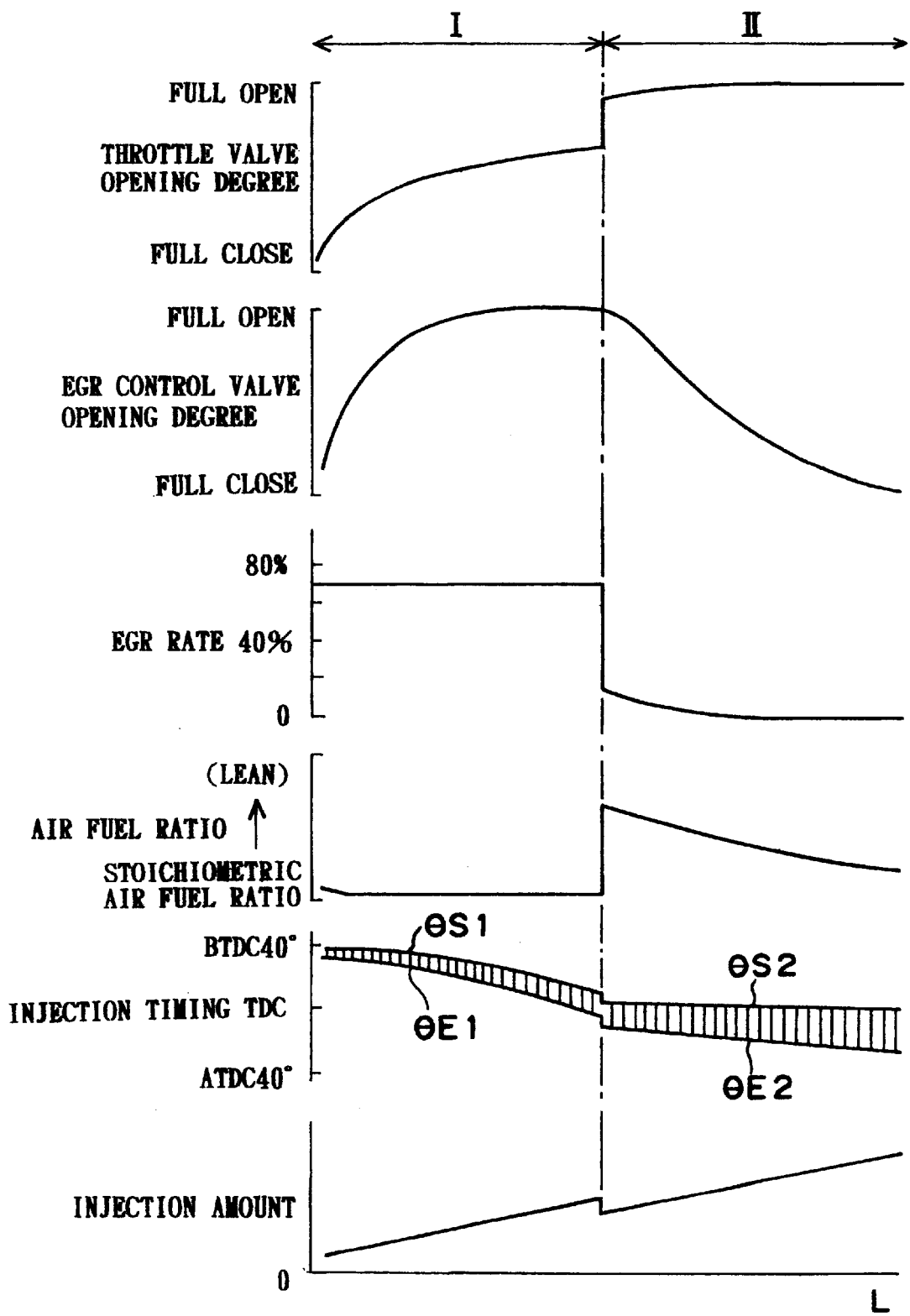
FIG. 8 is a graph which shows an opening degree of a throttle valve, an opening degree of an EGR control valve, an EGR rate, an air fuel ratio, an injection timing and an injection amount for required load.

Next, a description will briefly explain the operation control in the first operation area I and the second operation area II referring to FIG. 8.

FIG. 8 shows an opening degree of the throttle valve 20 with respect to the required load L, an opening degree of the EGR control valve 31, an EGR rate, an air fuel ratio, an injection timing and an injection amount. As shown in FIG. 8, in the first operation area I having a low required load L, the opening degree of the throttle valve 20 is gradually increased to the opening at approximately two-third degree from a nearly full close state as the required load L is increased, and the opening degree of the EGR control valve 31 is gradually increased to a full open state from a nearly full closed state as the required load L is increased. Further, in the embodiment shown in FIG. 8, the EGR rate is set to substantially 70% in the first operation area I, and the air fuel ratio is set to a slightly leaner air fuel ratio.

In other words, in the first operation area I, the opening degree of the throttle valve 20 and the opening degree of the EGR control valve 31 are controlled such that the EGR rate becomes substantially 70% and the air fuel ratio becomes slightly leaner. Further, in the first operation area I, fuel injection is performed prior to the compression top dead center TDC. In this case, an injection start timing θS1 is delayed as the required load L becomes high, and an injection end timing θE1 is also delayed as the injection start timing θS is delayed.

Further during the idling operation, the throttle valve 20 is closed to a near full closed state, and at this time, the EGR control valve 31 is also closed to a near full closed state. When closing the throttle valve 20 to the near full closed state, the pressure within the combustion chamber 5 at the beginning of the compression becomes low. As a result, the compression pressure becomes small. When the compression pressure becomes small, the compression executed by the piston 4 is reduced. As a result, the vibration of the engine main body 1 becomes small. That is, during idling operation, in order to restrict the vibration of the engine main body 1, the throttle valve 20 is closed to the near full closed state.

In this case, the vehicle is generally provided with auxiliary machinery driven by the engine, such as an air conditioner. In this case, when auxiliary machinery such as the air conditioner is operated during idling operation, the engine speed is reduced, causing the risk of an engine stall. Accordingly, in the case where auxiliary machinery such as the air conditioner is operated during idling operation, it has been conventionally structured to increase the amount of the mixed gas supplied within the combustion chamber in the gasoline engine, that is, the amount of the intake air and the amount of the fuel so as to increase the engine speed, and as well as increase the fuel injection amount in the diesel engine so as to increase the engine speed.

However, the first combustion mentioned above utilizes an endothermic operation due to the EGR gas, so that it is necessary to hold the EGR rate to a level equal to or more than a certain fixed value in order to perform a new combustion. However, such as in the conventional gasoline engine, when simply increasing the amount of the intake air and the amount of the fuel in order to increase the engine speed, the EGR rate is lowered, so that there is a risk that the new combustion can not be maintained.

Further, the new combustion is performed under an existence of a large amount of EGR gas, so that such as in the conventional diesel engine, when simply increasing the fuel injection amount in order to increase the engine speed, air becomes insufficient and combustion is only deteriorated.

That is, in order to increase the engine speed under the new combustion, it is necessary to increase the amount of the EGR gas in addition to the amount of the fuel and the amount of the intake air.

When the operation area of the engine changes from the first operation area I to the second operation area II, the opening degree of the throttle valve 20 is increased from the open state at two-third degree to the full open state stepwise. At this time, in the embodiment shown in FIG. 8, the EGR rate is reduced stepwise from substantially 70% to 40% or less and the air fuel ratio is increased stepwise. That is, since the EGR rate exceeds the EGR rate range (FIG. 5) in which a large amount of smoke is generated, it is no longer generated when the operation area of the engine changes from the first operation area I to the second operation area II.

In the second operation area II, the second combustion, that is, the conventional combustion is performed. In accordance with this combustion method, a very small amount of soot and NOx are generated. However, the heat efficiency is higher than that of the low temperature combustion. When the operation area of the engine changes from the first operation area I to the second operation area II, the injection amount is reduced stepwise as shown in FIG. 8. In this second operation area II, the throttle valve 20 is kept in the full open state except for a small portion thereof, and the opening degree of the EGR control valve 31 is gradually reduced as the required load L becomes high. Further, in this operation area II, the EGR rate becomes low as the required load L becomes high, and the air fuel ratio becomes low as the required load L becomes high. However, the air fuel ratio is set to lean even when the required load L becomes high. Further, in the second operation area 11, the injection start timing θS2 is set to be in the vicinity of the compression top dead center TDC, and the injection finish timing θE2 is delayed as the fuel injection amount is increased.

Figure 9:
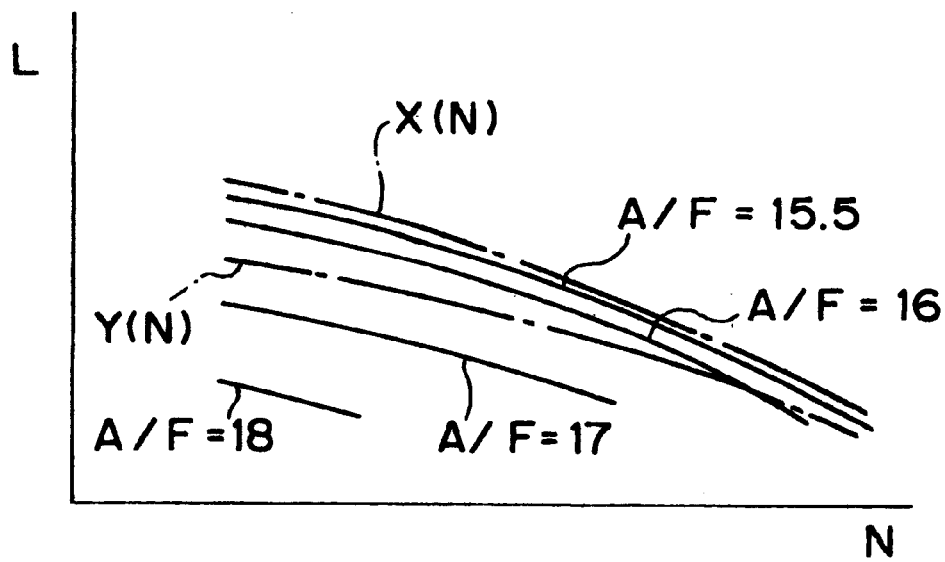
FIG. 9 is a graph which shows an air fuel ratio in the first operation area I.

FIG. 9 shows the air fuel ratio A/F in the first operation area I. In FIG. 9, curves indicated by A/F=15.5, A/F=16, A/F=17 and A/F=18 respectively show the states at the air fuel ratios 15.5, 16, 17 and 18, each of the air fuel ratios between the curves is defined proportionally. As shown in FIG. 9, the air fuel ratio becomes lean in the first operation area I, and further, the air fuel ratio A/F is made lean as the required load L becomes low.

That is, the amount of heat generated by combustion is reduced as the required load L becomes low. Accordingly, low temperature combustion can be performed even when lowering the EGR rate as the required load L becomes low. When lowering the EGR rate, the air fuel ratio becomes large. As shown in FIG. 9, the air fuel ratio A/F is made large as the required load L becomes low. As the air fuel ratio A/F is increased, the specific fuel consumption is improved. In order to make the air fuel ratio as lean as possible, in accordance with the embodiment of the present invention, the air fuel ratio A/F is increased as the required load L becomes low.

On the contrary, in the first operation area I, the EGR rate is set to an optimum EGR rate in accordance with the operation area of the engine. The EGR rate EG is preliminarily stored within the ROM 42 as a function of the required load L and the engine speed N in the form of a map as shown in FIG. 10.

Figure 10:
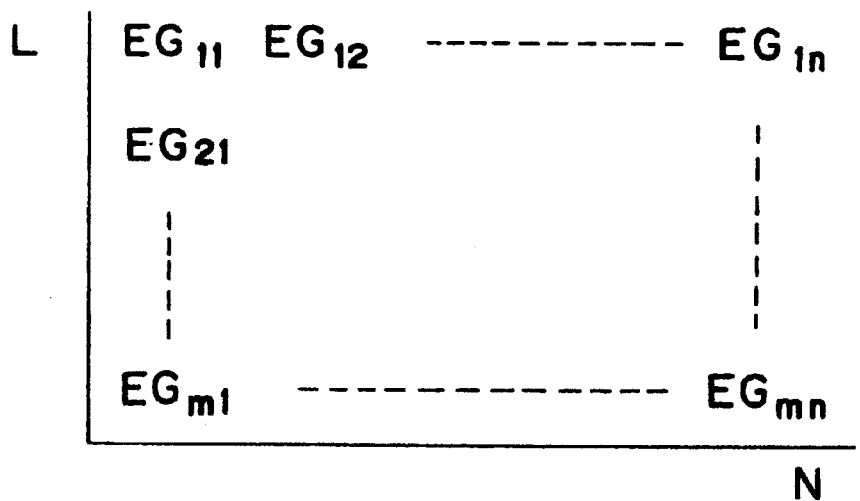
FIG. 10 is a view which shows a map of an EGR rate in the first operation area I.
Figure 11A:
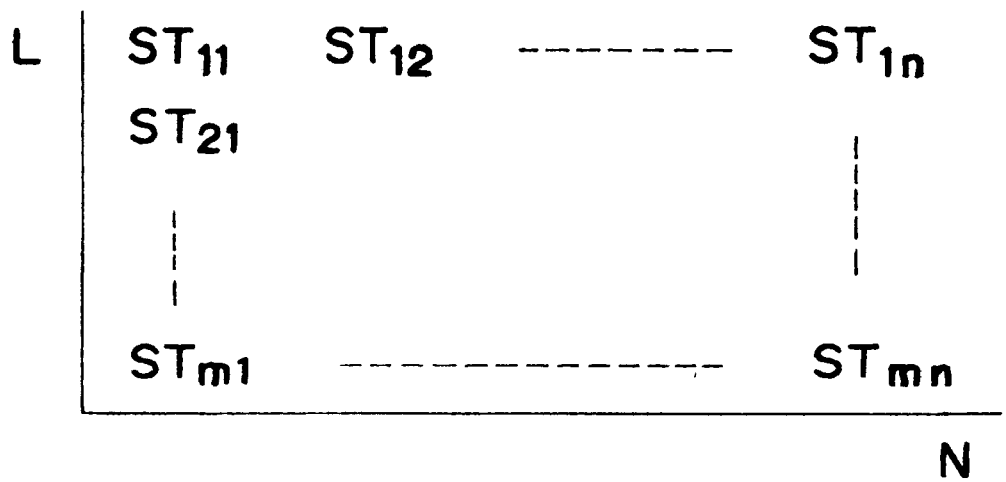
Figure 11B:
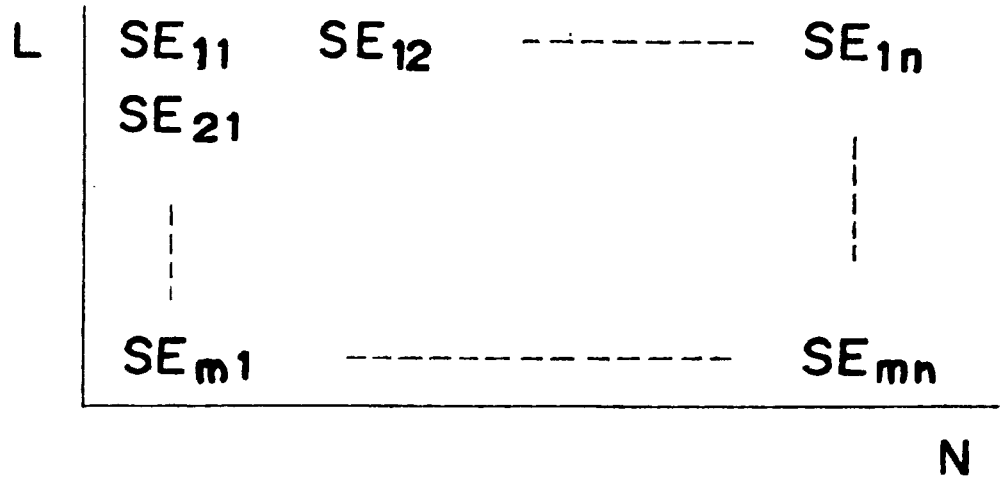

In this case, a target opening degree ST of the throttle valve 20 required for setting the air fuel ratio to the target air fuel ratio A/F shown in FIG. 9 and setting the EGR rate to the target EGR rate EG shown in FIG. 10 is preliminarily stored within the ROM 42 as a function of the required load L and the engine speed N in the form of a map as shown in FIG. 11A. Further a target opening degree SE of the EGR control valve 31 required for setting the air fuel ratio to the target air fuel ratio A/F shown in FIG. 9 and setting the EGR rate to the target EGR rate EG shown in FIG. 10 is preliminarily stored within the ROM 42 as a function of the required load L and the engine speed N in the form of a map as shown in FIG. 11B.

Figure 12:
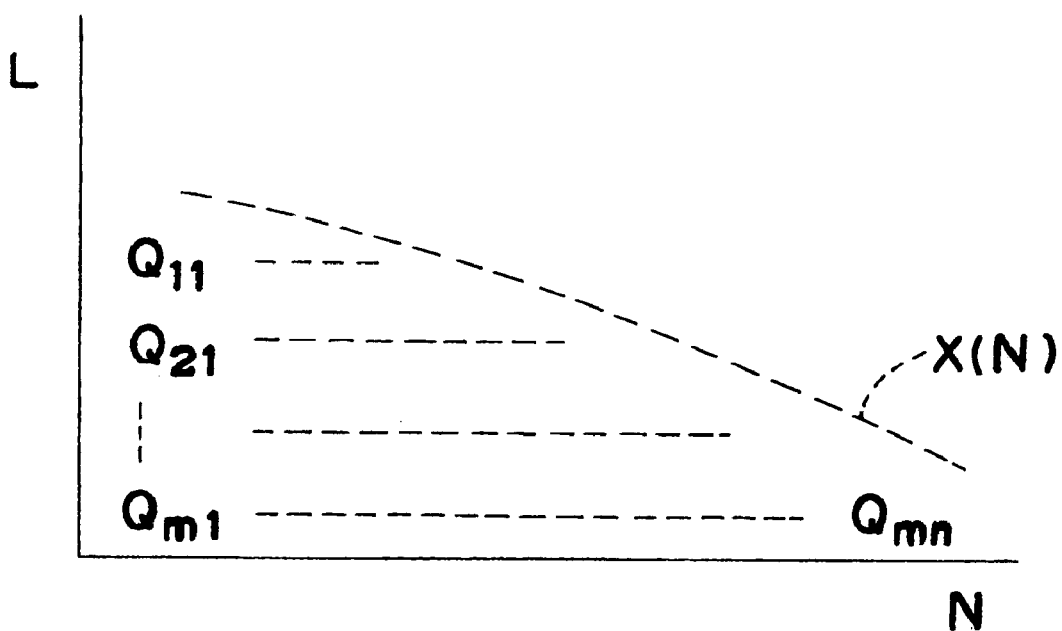
FIG. 12 is a view which shows a map of the injection amount.

Further, an injection amount Q in the first operation area I is increased as the required load L is increased as shown in FIG. 8. The injection amount Q is a function of the engine speed, and the injection amount Q is preliminarily stored within the ROM 42 as a function of the required load L and the engine speed N in the form of a map as shown in FIG. 12.

Figure 13A:
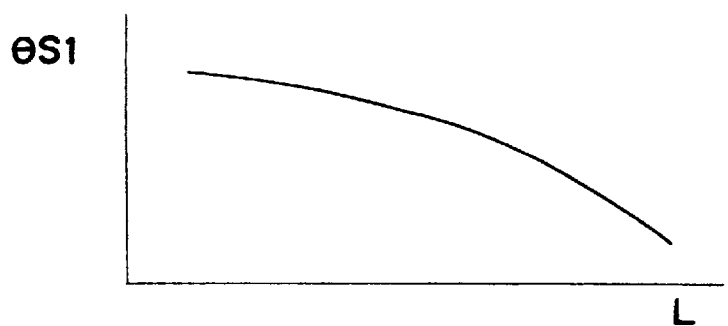
FIGS. 13A–13C are views which show an injection start timing.
Figure 13B:
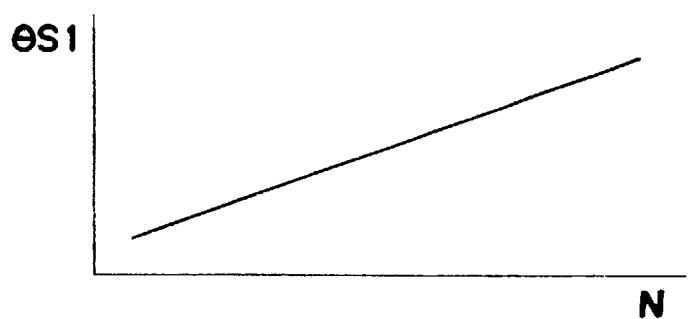

The injection start timing θS1 in the first operation area I is delayed as the required load L is increased as shown in FIG. 8. That is, the injection start timing θS1 is defined in terms of the lead angle, the lead angle θS1 of the injection start timing is reduced as the required load L is increased as shown in FIG. 13A. Further, the lead angle θS1 of the injection start timing is made large as the engine speed N is increased as shown in FIG. 13B.

Figure 13C:
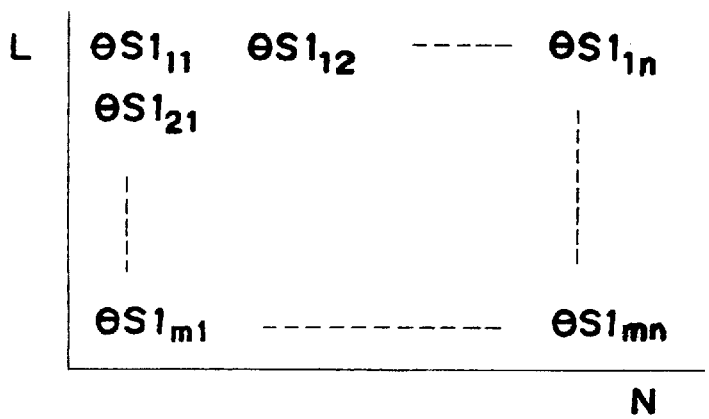

In the embodiment in accordance with the present invention, the injection start timing is a function of the air fuel ratio A/F, the EGR rate EG, a temperature GT of the gas admitted within the combustion chamber 5, an absolute pressure PM within the intake passage, a temperature WT of an engine cooling water and a humidity DF of the intake air. A standard lead angle θS1 of the injection start timing when the air fuel ratio A/F is a standard air fuel ratio $(A/F_0)$, the EGR rate is a standard EGR rate $EG_0$, the temperature GT of the intake gas is a standard temperature $GT_0$, the absolute pressure PM within the intake passage is a standard pressure $PM_0$, the engine cooling water temperature WT is a standard temperature $WT_0$ and the humidity DF of the intake air is a standard humidity $DF_0$ is previously stored within the ROM 42 as a function of the required load L and the engine speed N in the form of a map as shown in FIG. 13C.

Figure 14:
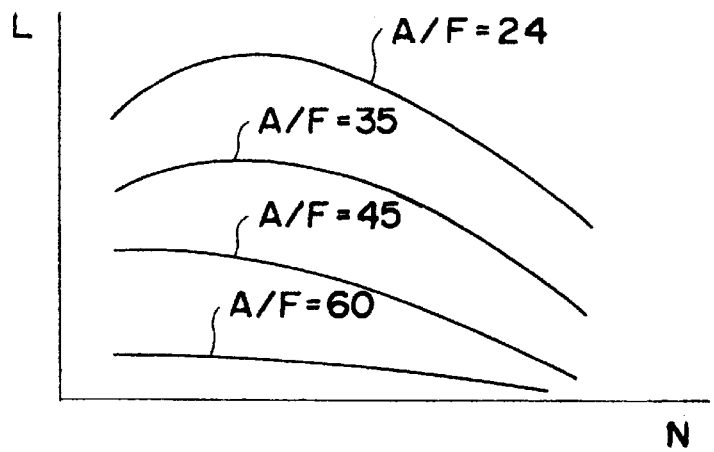
FIG. 14 is a graph which shows an air fuel ratio in a second combustion mode.
Figure 15A:
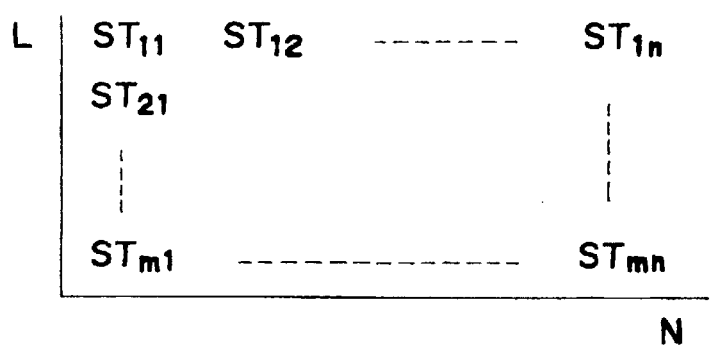
Figure 15B:
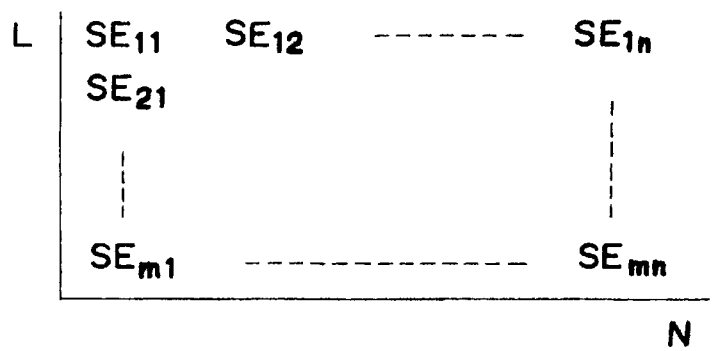

FIG. 14 shows the target air fuel ratio when the second combustion mode, that is, the combustion in accordance with the conventional method is performed. In this case, in FIG. 14, curves indicated by A/F=24, A/F=35, A/F=45 and A/F=60 respectively show states having target air fuel ratios 24, 35, 45 and 60. A target opening degree ST of the throttle valve 20 required for setting the air fuel ratio to the target air fuel ratio is preliminarily stored within the ROM 42 as a function of the required load L and the engine speed N in the form of a map as shown in FIG. 15A. A target opening degree SE of the EGR control valve 31 required for setting the air fuel ratio to the target air fuel ratio is preliminarily stored within the ROM 42 as a function of the required load L and the engine speed N in the form of a map as shown in FIG. 15B.

Figure 16:
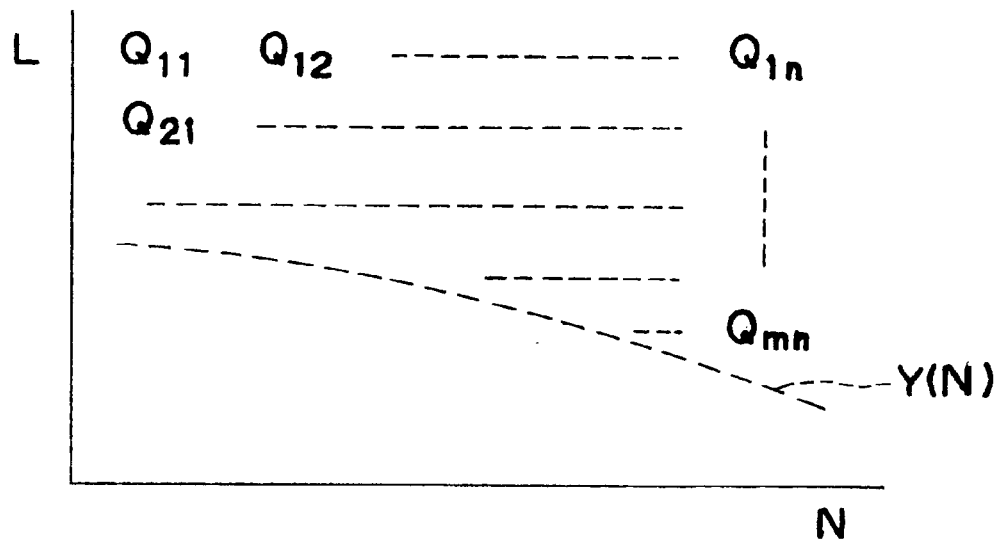
FIG. 16 is a view which shows a map of the injection amount.
Figure 17:
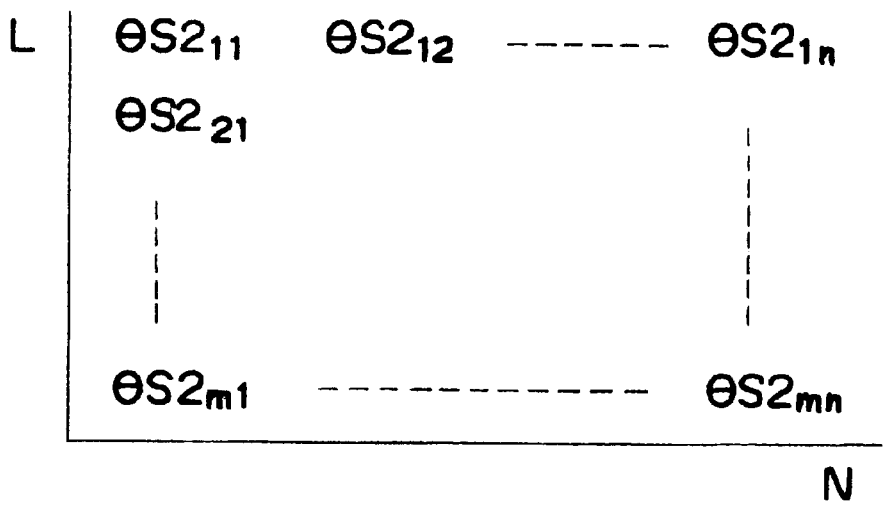
FIG. 17 is a view which shows an injection start timing.

Further, the injection amount Q when the second combustion mode is performed is preliminarily stored within the ROM 42 as a function of the required load L and the engine speed N in the form of a map as shown in FIG. 16. The injection start timing $\theta S2$ when the second combustion mode is performed is preliminarily stored within the ROM 42 as a function of the required load L and the engine speed N in the form of a map as shown in FIG. 17.

In this embodiment, the injection amount for the first combustion mode in the first operation area I and the injection amount in the second operation area II are stored within the ROM 42 in the form of different maps. Under the first combustion mode, the generated torque of the engine is susceptible to the change in an air amount and is not susceptible to the change in the injection amount Q. Under the second combustion mode, the generated torque of the engine is susceptible to the change in the injection amount Q and is not susceptible to the change in the air amount. Accordingly, in setting the injection amount on the map, an interval of the data between the injection amount for the first combustion mode and the injection amount for the second combustion mode may be increased. This makes it possible to further reduce the capacity of a memory for storing the data.

In the case where the first combustion mode is performed, when the standard lead angle $\theta S1$ of the injection start timing under the standard air fuel ratio A/F $(A/F)_0$, the EGR rate becomes the standard EGR rate $EG_0$, the temperature GT of the intake gas becomes the standard temperature $GT_0$, the absolute pressure PM within the intake passage becomes the standard pressure $PM_0$, the engine cooling water temperature WT becomes the standard temperature $WT_0$ and the humidity DF of the intake air becomes the standard humidity $DF_0$, and stable combustion without causing smoke or misfire can be obtained by setting the lead angle of the injection start timing to the standard lead angle $\theta S1$ shown by the map in FIG. 13C as long as the injection is not changed.

However, when setting the lead angle of the injection start timing to the standard lead angle $\theta S1$, for example, when the temperature GT of the gas admitted into the combustion chamber 5 becomes substantially higher than the standard temperature $GT_0$, the temperature of the fuel and the surrounding gas during combustion is excessively increased. Therefore, smoke is generated. Accordingly, in this case, it is necessary to correct so as to make the lead angle at the injection start timing smaller than the standard lead angle $\theta S1$, that is, delay the injection start timing.

When leaving the lead angle of the injection start timing in the advance lead angle $\theta S1$ when the temperature GT of the gas admitted into the combustion chamber 5 becomes lower than the standard temperature $GT_0$ to the greater degree, the temperature of the fuel and the surrounding gas during combustion becomes low, leading to misfire. Accordingly, in this case, it is necessary to correct so as to make the lead angle of the injection start timing greater than the standard lead angle $\theta S1$, that is, quicken the injection start timing.

Next, the description will be given with respect to the correction amount of the lead angle $\theta S1$ of the injection start timing with reference to FIGS. 18A–F.

Figure 18A:
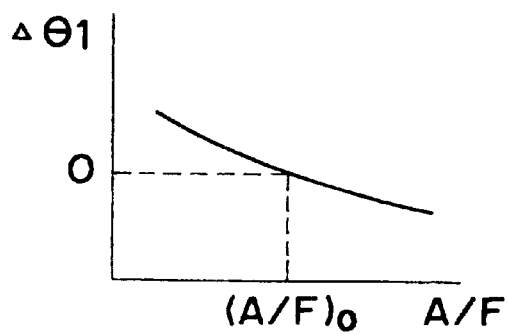
FIGS. 18A–18F are views which show different correction amounts.

FIG. 18A shows a relation between the air fuel ratio A/F and a correction amount $\Delta\theta 1$ with respect to the lead angle $\theta S1$ of the injection start timing. Since the combustion within the combustion chamber 5 becomes active as the air fuel ratio A/F is increased, the temperature of the fuel and the surrounding gas at a time of combustion becomes high, and since the combustion gradually becomes inactive when the air fuel ratio A/F is reduced, the temperature of the fuel and the surrounding gas at a time of combustion becomes low. Accordingly, when the air fuel ratio A/F becomes greater than the standard value $(A/F)_0$, the correction amount $\Delta\theta 1$ gradually becomes a great negative value, and when the air fuel ratio A/F becomes smaller than the standard value $(A/F)_0$, the correction amount $\Delta\theta 1$ gradually becomes a great positive value.

Figure 18B:
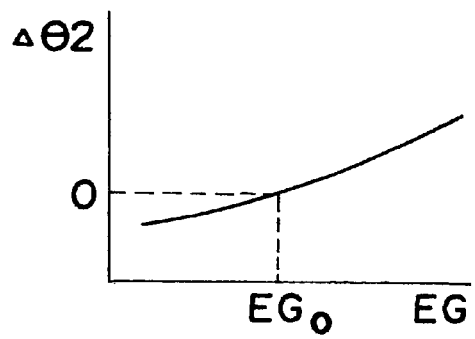

FIG. 18B shows a relation between the EGR rate EG and a correction amount $\Delta\theta 2$ with respect to the lead angle $\theta S1$ of the injection start timing. Since the combustion within the combustion chamber 5 becomes inactive as the EGR rate EG is increased, the temperature of the fuel and the surrounding gas at a time of combustion becomes low, and since the combustion gradually becomes active when the EGR rate EG is reduced, the temperature of the fuel and the surrounding gas at a time of combustion becomes high. Accordingly, when the EGR rate EG becomes greater than the standard value $EG_0$, the correction amount $\Delta\theta 2$ gradually becomes a great positive value, and when the EGR rate EG becomes smaller than the standard value $EG_0$, the correction amount $\Delta\theta 2$ gradually becomes a great negative value.

Figure 18C:
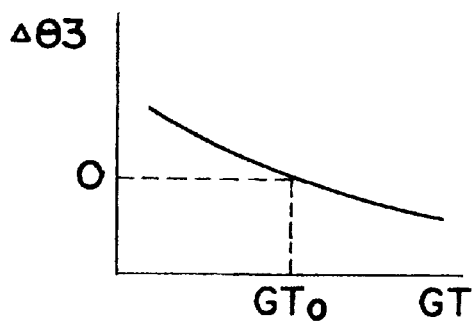

FIG. 18C shows a relation between the temperature GT of the intake gas flowing into the combustion chamber 5 and a correction amount $\Delta\theta 3$ with respect to the lead angle $\theta S1$ at the injection start timing. When the intake gas temperature GT becomes high, the temperature of the fuel and the surrounding gas during combustion becomes high, and when the intake gas temperature GT becomes low, the temperature of the fuel and the surrounding gas during combustion becomes low. Accordingly, when the intake gas temperature GT becomes higher than the standard value $GT_0$, the correction amount $\Delta\theta 3$ gradually becomes a large negative value. When the intake gas temperature GT becomes lower than the standard value $GT_0$, the correction amount $\Delta\theta 3$ gradually becomes a large positive value.

Figure 18D:
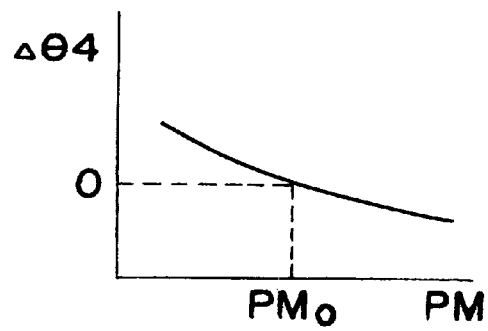

FIG. 18D shows a relation between the absolute pressure PM within the intake passage and a correction amount $\Delta\theta 4$ with respect to the lead angle $\theta S1$ at the injection start timing. When the absolute pressure PM within the intake passage becomes high, the temperature within the combustion chamber 5 at the end of a compression stroke becomes high. Then the temperature of the fuel and the surrounding gas during combustion becomes high, and when the absolute pressure PM within the intake passage becomes low, the temperature within the combustion chamber 5 at the end of the compression stroke becomes low. Then the temperature of the fuel and the surrounding gas at a time of combustion becomes low. Accordingly, when the absolute pressure PM within the intake passage becomes higher than the standard value $PM_0$, the correction amount $\Delta\theta 4$ gradually becomes a large negative value, and when the absolute pressure PM within the intake passage becomes lower than the standard value $PM_0$, the correction amount $\Delta\theta 4$ gradually becomes a large positive value.

Figure 18E:
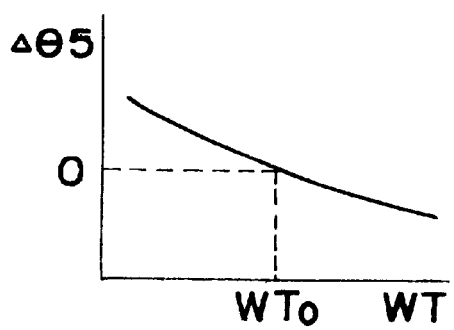

FIG. 18E shows a relation between the engine cooling water temperature WT and a correction amount $\Delta\theta 5$ with respect to the lead angle $\theta S1$ at the injection start timing. When the engine cooling water temperature WT becomes high, the temperature of the gas within the combustion chamber 5 becomes high. Then the temperature of the fuel and the surrounding gas during combustion becomes high. When the engine cooling water temperature WT becomes low, the temperature of the gas within the combustion chamber 5 becomes low. Then the fuel and the surrounding gas during combustion becomes low. Accordingly, when the engine cooling water temperature WT becomes higher than the standard value $WT_0$, the correction amount $\Delta\theta 5$ gradually becomes a large negative value. When the engine cooling water temperature WT becomes lower than the standard value $WT_0$, the correction amount $\Delta\theta5$ gradually becomes a large positive value.

Figure 18F:
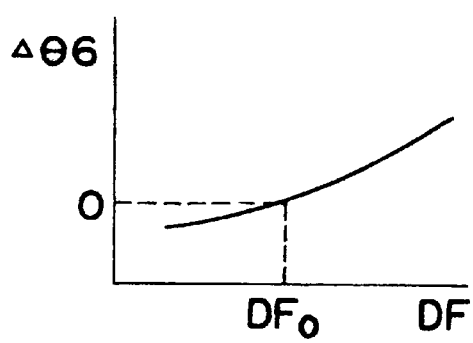

FIG. 18F shows a relation between the humidity DF of the intake air and a correction amount $\Delta\theta6$ with respect to the lead angle $\theta S1$ at the injection start timing.

When the humidity DF of the intake air becomes high, the temperature of the fuel and the surrounding gas during combustion becomes low due to the endothermic operation of a water contained in the intake air. When the humidity DF of the intake air becomes low, the temperature of the fuel and the surrounding gas during combustion becomes high due to reduction in the endothermic operation of a moisture contained in the intake air. Accordingly, when the humidity DF of the intake air becomes larger than the standard value $DF_0$, the correction amount $\Delta\theta6$ gradually becomes a large positive value. When the humidity DF of the intake air becomes smaller than the standard value $DF_0$, the correction amount $\Delta\theta6$ gradually becomes a large negative value.

In this case, each of the relations shown in FIGS. 18A to 18F is preliminarily stored within the ROM 42.

When the required load L or the engine speed N is changed during the first combustion mode, the injection amount Q is changed in accordance therewith, the lead angle $\theta S1$ at the injection start timing is changed, the opening degree ST of the throttle valve 20 is changed, and the opening degree SE of the EGR control valve 31 is changed. In this case, an actual injection amount from the fuel injection valve 6 is immediately set to the injection amount Q calculated from the map shown in FIG. 12. In the lead angle at the actual injection start timing, the standard lead angle $\theta S1$ calculated from the map shown in FIG. 13 is immediately set to the lead angle corrected by each of the correction amounts $\Delta\theta1$–$\Delta\theta6$ as shown in FIG. 18.

At this time, the target opening degree of the throttle valve 20 is set to the target opening degree ST as shown in FIG. 11A and the target opening degree of the EGR control valve 31 is set to the target opening degree SE as shown in FIG. 11B, however, the throttle valve 20 and the EGR control valve 31 do not immediately become the corresponding opening degrees due to the operation delay. As a result, as mentioned before, since the air fuel ratio becomes rich in comparison with the target air fuel ratio when the injection amount Q is increased, misfire is likely to easily occur. Since the air fuel ratio becomes lean in comparison with the target air fuel ratio when the injection amount Q is reduced, smoke is likely to be easily generated.

Then, in accordance with the present invention, the structure is made to quicken the injection timing such that misfire is not generated when the injection amount Q is increased, and is made to delay the injection timing such that smoke is not generated when the injection amount Q is reduced.

In this case, the fuel injection amount can be controlled by changing the injection pressure of the fuel. That is, since the injection rate becomes high as the injection pressure becomes high, quickening of the injection finish timing occurs. The quickening of the injection finish timing represents that the next injection timing of the fuel continuously performed is quickened accordingly. Therefore, quickening the injection finish timing is equivalent to the quickening of the fuel injection timing. Accordingly, preliminarily stored in the ROM 42 as the correction amount with respect to the standard fuel pressure PC within the common rail 34 as a map is each of the correction amounts of the fuel injection timing at the air fuel ratio A/F, the EGR rate EG, the temperature GT of the gas admitted within the combustion chamber 5, the absolute pressure PM within the intake passage, the engine cooling water temperature WT and the humidity DF of the intake air, as the operation parameters shown in FIGS. 18A to 18F. They can be used as the correction values of the lead angle value.

Next, a description will be given with respect to the operation control with reference to FIGS. 19 and 20.

Figure 19:
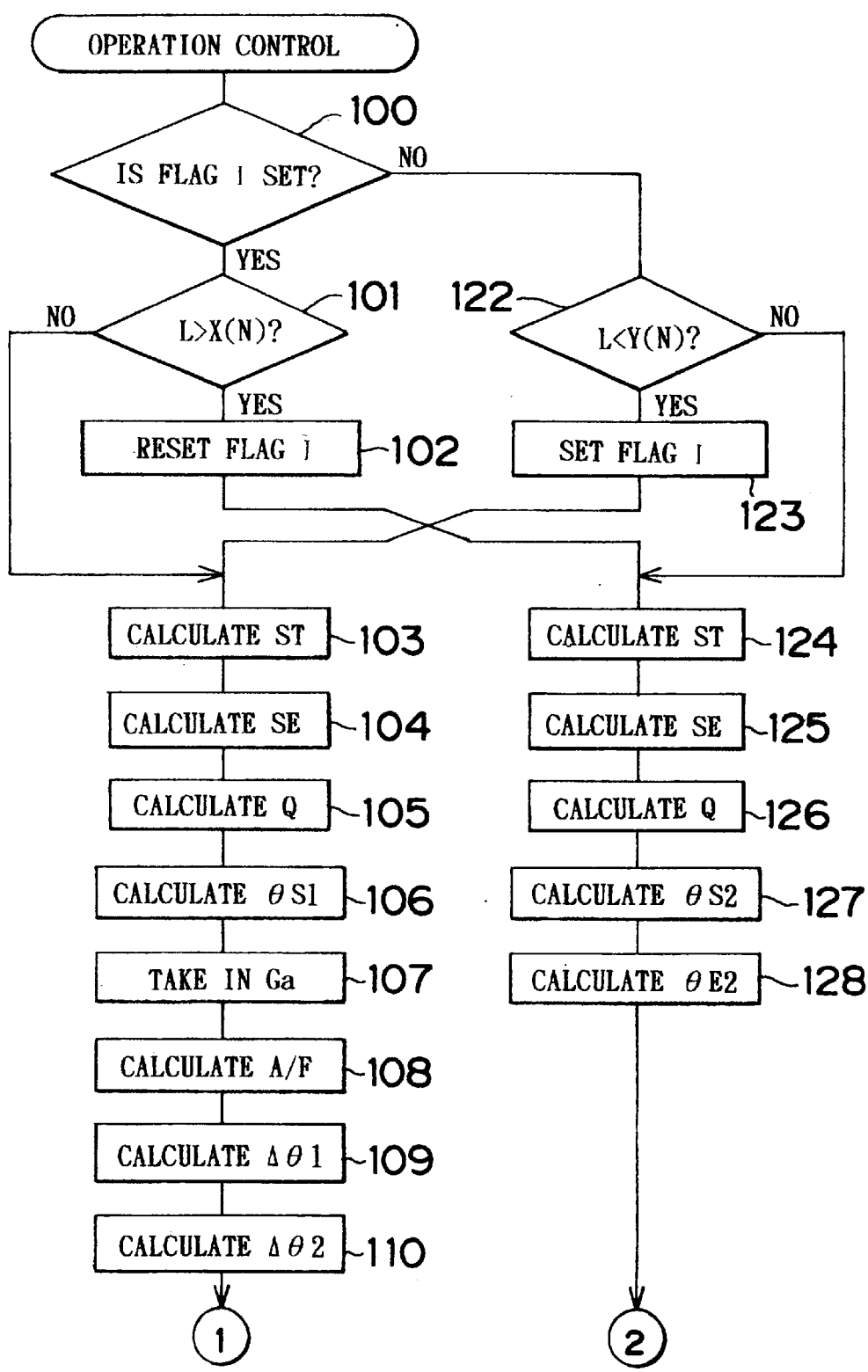
FIG. 19 is a flow chart for controlling an operation of the engine.
Figure 20:
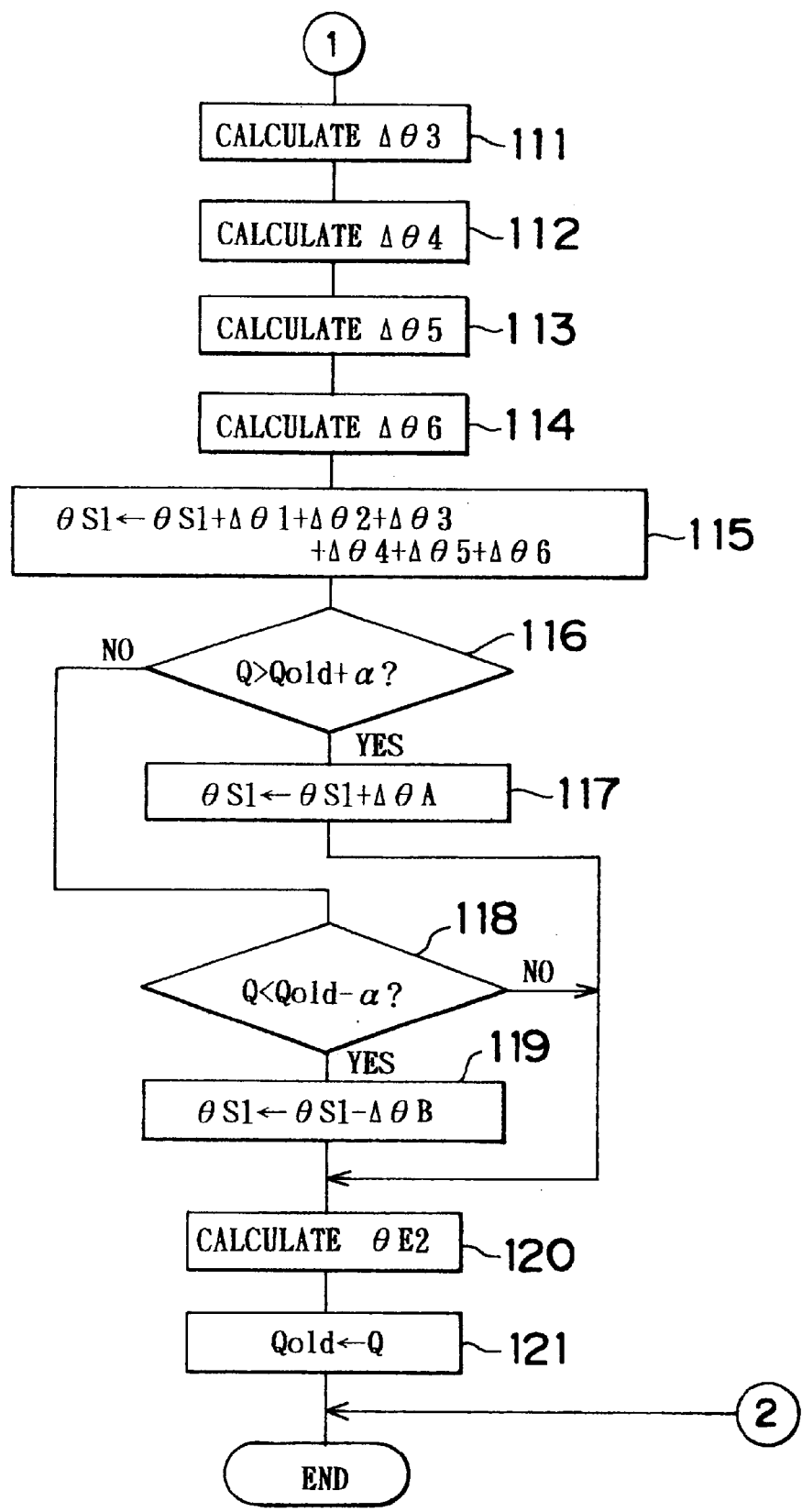
FIG. 20 is a flow chart for controlling an operation of the engine.

With reference to FIGS. 19 and 20, at first, in step 100, it is determined whether or not a flag I, indicating that the operation area of the engine is in the first operation area I, is set. When the flag I is set, that is, the operation area of the engine is in the first operation area I, the process goes to step 101 where it is determined whether or not the required load L becomes greater than the first boundary X(N). When a relation L≦X(N) is established, the process goes to step 103 where the low temperature combustion is performed.

In step 103, the target opening degree ST of the throttle valve 20 is calculated from the map shown in FIG. 11A, and the opening degree of the throttle valve 20 is set to the target opening degree ST. Next, in step 104, the target opening degree of the EGR control valve 31 is calculated from the map as shown in FIG. 11B, and the opening degree of the EGR control valve 31 is set to the target opening degree SE. Next, in step 105, the injection amount Q is calculated on the basis of the map shown in FIG. 12. Next, in step 106, the standard lead angle $\theta S1$ at the injection start timing is calculated on the basis of the map shown in FIG. 13C.

Next, in step 107, a mass flow amount Ga of the intake air detected by the mass flow amount detecting device 63 is taken in. Next, in step 108, the air fuel ratio A/F is calculated on the basis of the fuel injection amount Q and the mass flow amount Ga of the intake air. Next, in step 109, the correction amount $\Delta\theta1$ is calculated from the relation shown in FIG. 18A on the basis of the air fuel ratio A/F. Next, in step 110, the correction value $\Delta\theta2$ is calculated from the relation shown in FIG. 18B on the basis of the EGR rate EG calculated on the basis of the map shown in FIG. 10.

Next, in step 111, the correction amount $\Delta\theta3$ is calculated from the relation shown in FIG. 18C on the basis of the intake gas temperature GT detected by the temperature sensor 62. Next, in step 112, the correction value $\Delta\theta4$ is calculated from the relation shown in FIG. 18D on the basis of the absolute pressure PM within the vacuum passage detected by the pressure sensor 61. Next, in step 113, the correction value $\Delta\theta5$ is calculated from the relation shown in FIG. 18E on the basis of the engine cooling water temperature WT detected by the water temperature sensor 60. Next, in step 114, the correction value $\Delta\theta6$ is calculated from the relation shown in FIG. 18F on the basis of the humidity DF of the intake air detected by the humidity sensor 64. Next, in step 115, the final lead angle $\theta S1$ ($=\theta S1+\Delta\theta1+\Delta\theta2+\Delta\theta3+\Delta\theta4+\Delta\theta5+\Delta\theta6$) of the injection start timing is calculated by adding the correction values $\Delta\theta1$ to $\Delta\theta6$ to the standard lead angle $\theta S1$.

Next, in step 116, it is determined whether or not the injection amount Q at this time is greater than a value $(Q_{old}+\alpha)$ obtained by adding a fixed value $\alpha$ to the injection amount $Q_{old}$ of the preceding time. When the relation $Q>Q_{old}+\alpha$ is established, the process goes to step 117, and the final injection start timing $\theta S1$ ($=\theta S1+\Delta\theta A$) is calculated by adding a fixed value $\Delta\theta A$ to the injection start timing $\theta S1$ calculated in step 115. Next, the process goes to step 120. As mentioned above, when the relation $Q>Q_{old}+\alpha$ is established, that is, the injection amount Q is increased, the injection timing can be quickened.

On the contrary, in step 116, when it is determined that the relation $Q \leq Q_{old}+\alpha$ is established, the process goes to step 118 and it is determined whether or not the injection amount Q at this time is smaller than a value ($Q_{old}-\alpha$) obtained by subtracting the fixed value a from the injection amount $Q_{old}$ at the preceding time. When the relation $Q<Q_{old}-\alpha$ is established, the process goes to step 119 and the final injection start timing θS1 (=θS1ΔθB) is calculated by subtracting a fixed value ΔθB from the injection start timing θS1 calculated in step 115. Next, the process goes to step 120. As mentioned above, when the relation $Q<Q_{old}-\alpha$ is established, that is, the injection amount Q is reduced, the injection timing is delayed.

On the contrary, when the relation $Q_{old}-\alpha \leq Q \leq Q_{old}+\alpha$ is established, the process jumps from step 118 to step 120. In step 120, an injection finish timing θE2 is calculated on the basis of the final lead angle θS1, the injection amount Q and the fuel pressure within the common rail 34 detected by the fuel pressure sensor 36. Next, in step 121, the injection amount Q at this time is set to $Q_{old}$.

On the contrary, in step 101, when it is determined that the relation L>X(N) is established, the process goes to step 102, a flag I is reset, and next, the process goes to step 124 and the second combustion mode is performed.

That is, in step 124, the target opening degree ST of the throttle valve 20 is calculated from a map shown in FIG. 15A, and the opening degree of the throttle valve 20 is set to the target opening degree ST. Next, in step 125, the target opening degree SE of the EGR control valve 31 is calculated from a map shown in FIG. 15B, and the opening degree of the EGR control valve 31 is set to the target opening degree SE. Next, in step 126, the injection amount Q is calculated on the basis of the map shown in FIG. 16, and next, in step 127, the injection start timing θS2 is calculated on the basis of the map shown in FIG. 17. Next, in step 128, the injection finish timing θE2 is calculated on the basis of the injection start timing θS2, the injection amount Q and the fuel pressure within the common rail 34.

When the flag I is reset, in the next process cycle, the process goes to step 122 from step 100 and it is determined whether or not the required load L becomes lower than the second boundary Y(N). When the relation L≧Y(N) is established, the process goes to step 124 and the second combustion mode is performed under a lean air fuel ratio.

On the contrary, in step 122, when it is determined that the relation L<Y(N) is established, the process goes to step 123, the flag I is set, and next the process goes to step 103 and the low temperature combustion is performed.

In the embodiment mentioned above, the structure is made such as to calculate the target opening degree ST of the throttle valve 20 and the target opening degree SE of the EGR control valve 31 necessary for achieving the target EGR rate in the first combustion mode on the basis of the map shown in FIGS. 11A and 11B and the fuel injection amount Q is calculated on the basis of the map of the required load L and the engine speed N. However, in the first combustion mode, the combustion is performed in a state where the EGR rate is high and in a state where the air amount around the fuel is small. In this case, if the fuel injection amount is increased, there does not exist air sufficient for burning the increased fuel, so that the torque generated by the engine is not increased. In this case, since the air amount around the fuel is increased when increasing the air amount, the combustion is active, so that the torque generated by the engine is increased. That is, in order to increase the output torque of the engine in response to the requirement when the required load is increased under the new combustion, it is necessary to immediately increase the air amount, so that it is sufficient to adjust the fuel injection amount for setting the air fuel ratio to the target air fuel ratio after the increasing operation of the air amount is performed.

As mentioned above, under the first combustion mode, the torque generated by the engine is sensitive to the change of the air amount and is insensitive to the change of the fuel injection amount, and under the second combustion mode, the torque generated by the engine is sensitive to the change of the fuel injection amount and is insensitive to the change of the air amount. Accordingly, in order to perform an optimum operation control in accordance with that aspect of the combustion, in the first combustion mode, it is possible to detect the intake air amount in the case where the intake gas amount is controlled and to control the fuel injection amount on the basis of the intake air amount.

The contents of that control will be described below.

Figure 21:
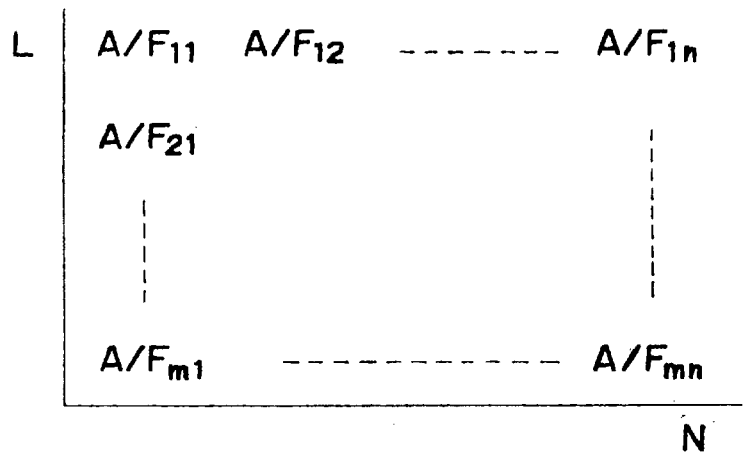
FIG. 21 is a view which shows a target air fuel ratio in a first operation area I in accordance with another embodiment.
Figure 22A:
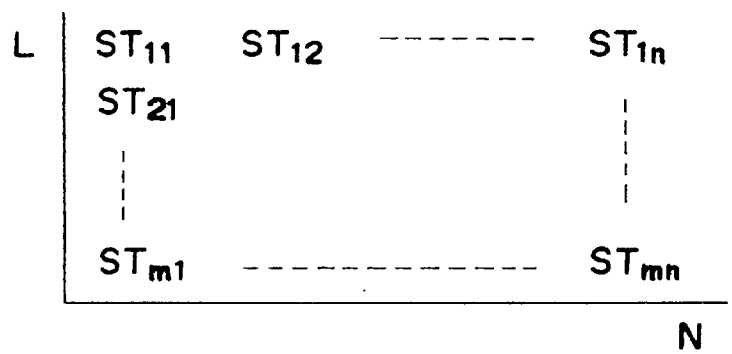
FIGS. 22A and 22B are views which show a map of a target opening degree of a throttle valve and the like in accordance with the other embodiment.
Figure 22B:
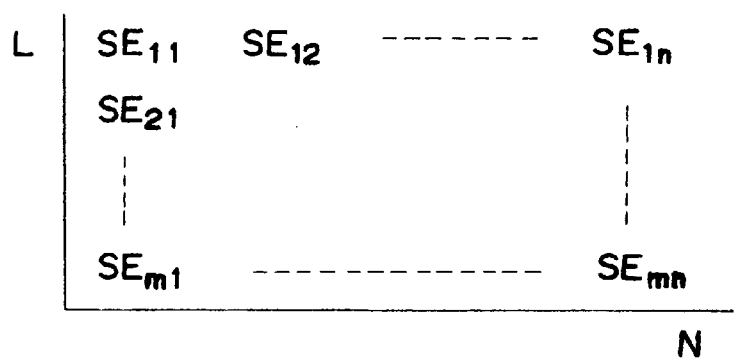

The target air fuel ratio A/F shown in FIG. 9 is previously stored within the ROM 42 as a function of the required load L and the engine speed N in the form of a map as shown in FIG. 21. The target opening degree ST of the throttle valve 20 necessary for setting the air fuel ratio to the target air fuel ratio A/F shown in FIG. 9 is previously stored within the ROM 42 as a function of the required load L and the engine speed N in the form of a map as shown in FIG. 22A. The target opening degree SE of the EGR control valve 31 necessary for setting the air fuel ratio to the target air fuel ratio A/F shown in FIG. 9 is previously stored within the ROM 42 as a function of the required load L and the engine speed N in the form of a map as shown in FIG. 22B.

Figure 23:
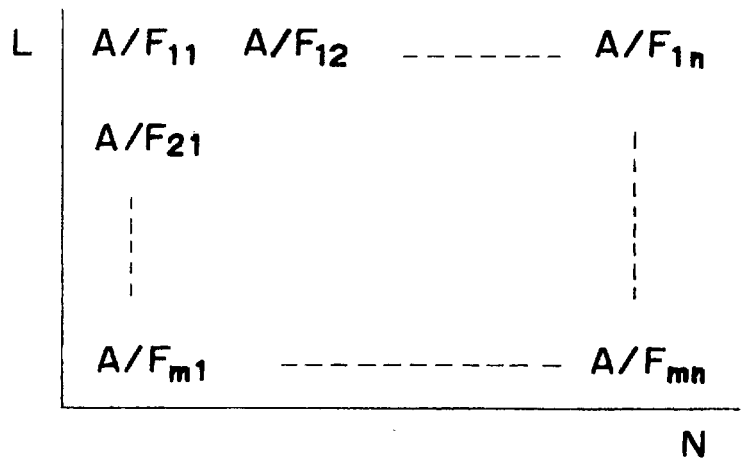
FIG. 23 is a view which shows a target air fuel ratio in a second combustion mode in accordance with the other embodiment.
Figure 24A:
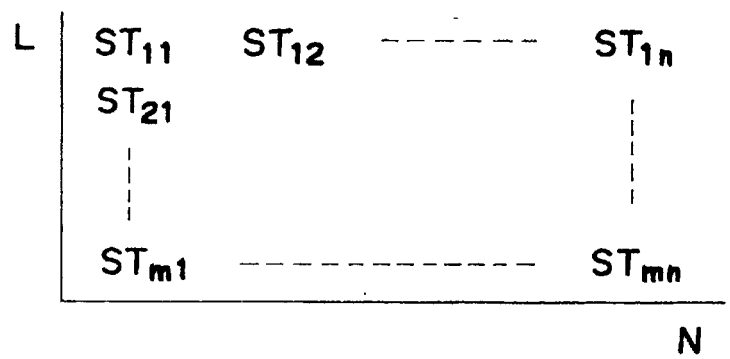
FIGS. 24A and 24B are views which show maps of a target opening degree of a throttle valve and the like in accordance with the other embodiment.
Figure 24B:
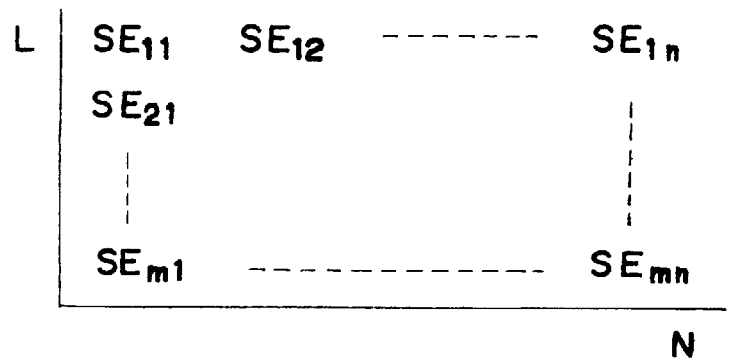

Next, when the second combustion mode, that is, the normal combustion in accordance with the conventional combustion method is performed, the target air fuel ratio A/F shown in FIG. 14 is previously stored within the ROM 42 as a function of the required load L and the engine speed N in the form of a map as shown in FIG. 23. Further, the target opening degree ST of the throttle valve 20 necessary for setting the air fuel ratio to the target air fuel ratio A/F shown in FIG. 14 is previously stored within the ROM 42 as a function of the required load L and the engine speed N in the form of a map as shown in FIG. 24A, and the target opening degree SE of the EGR control valve 31 necessary for setting the air fuel ratio to the target air fuel ratio A/F shown in FIG. 14 is previously stored within the ROM 42 as a function of the required load L and the engine speed N in the form of a map as shown in FIG. 24B.

Further, when the second combustion mode is performed, the fuel injection amount Q is calculated on the basis of the required load L and the engine speed N. The fuel injection amount Q is previously stored within the ROM 42 as a function of the required load L and the engine speed N in the form of a map as shown in FIG. 16.

Next, an operation control will be described below with reference to FIG. 25.

Figure 25:
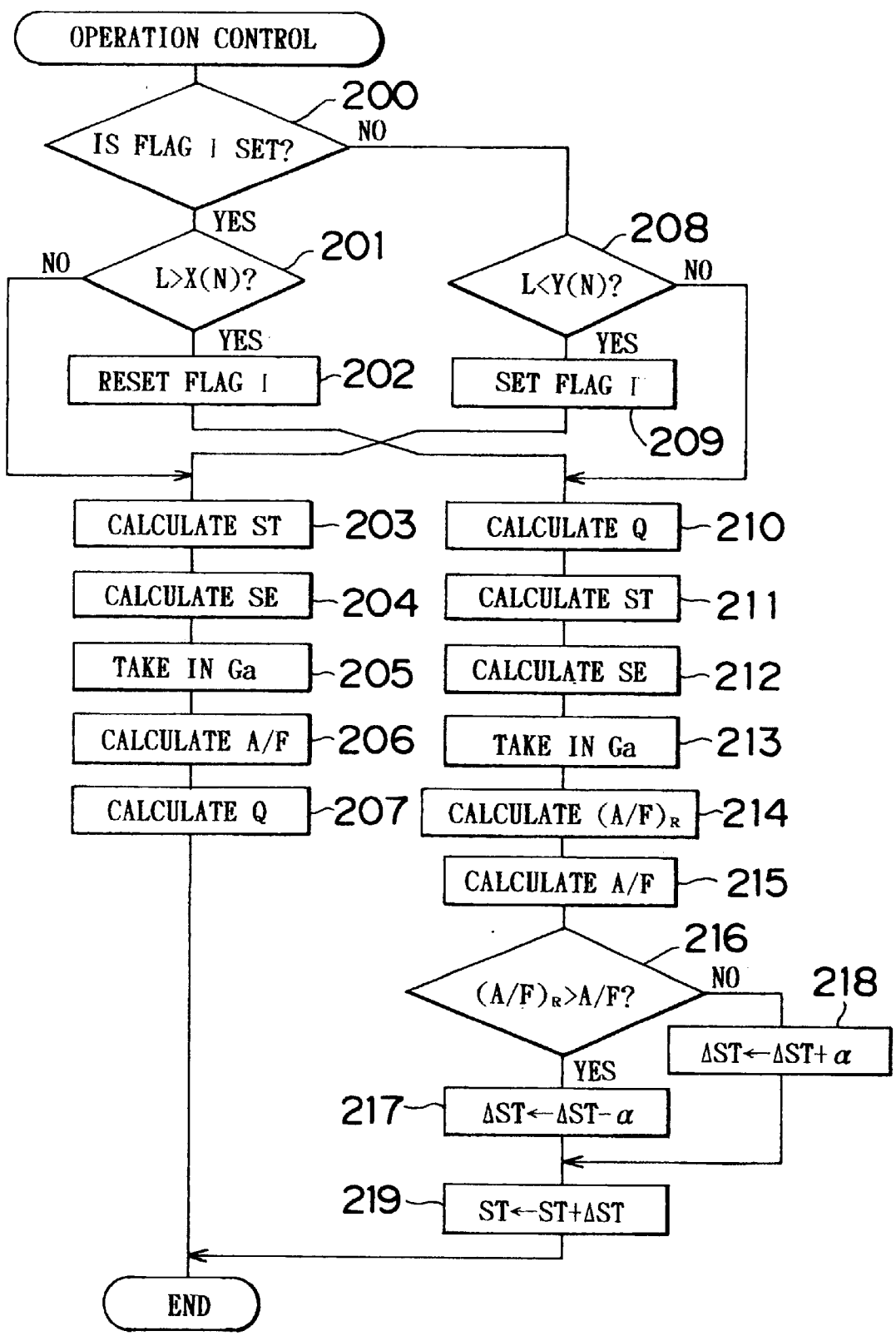
FIG. 25 is a flow chart for controlling an operation of the engine in accordance with the other embodiment.

With reference to FIG. 25, at first, in step 200, it is determined whether or not a flag I showing that the operation area of the engine is in the first operation area I is set. When the flag I is set, that is, the operation area of the engine is in the first operation area I, the process goes to step 201, so that it is determined whether or not the required load L becomes greater than the first boundary X(N). When a relation L≦X(N) is established, the process goes to step 203, and the low temperature combustion is performed.

That is, in step 203, the target opening degree ST of the throttle valve 20 is calculated on the basis of the map shown in FIG. 22A, and the opening degree of the throttle valve 20 is set to the target opening degree ST. Next, in step 204, the target opening degree SE of the EGR control valve 31 is calculated on the basis of the map shown in FIG. 22B, and the opening degree of the EGR control valve 31 is set to the target opening degree SE. Next, in step 205, the mass flow amount (hereinafter, simply refer to as an intake air amount) Ga of the intake air detected by the mass flow amount detecting device 63 is taken in. Next, in step 206, the target air fuel ratio A/F is calculated on the basis of the map shown in FIG. 21. Next, in step 207, the fuel injection amount Q necessary for setting the air fuel ratio to the target fuel ratio A/F is calculated on the basis of the intake air amount Ga and the target air fuel ratio A/F.

As mentioned above, in the case where the low temperature combustion is performed, when the required load L or the engine speed N is changed, the opening degree of the throttle valve 20 and the opening degree of the EGR control valve 31 are immediately made to coincide with the target opening degrees ST and SE corresponding to the required load L and the engine speed N. Accordingly, for example, when the required load L is increased, the amount of the air within the combustion chamber 5 is immediately increased, so that the torque generated by the engine is immediately increased.

On the contrary, when the intake air amount is changed in accordance that the opening degree of the throttle valve 20 or the opening degree of the EGR control valve 31 is changed, the change of the intake air amount Ga is detected by the mass flow amount detecting device 63, and the fuel injection amount Q is controlled on the basis of the detected intake air amount Ga. That is, the fuel injection amount Q is changed after the intake air amount Ga is actually changed.

In step 201, when it is determined that the relation L>X(N) is established, the process goes to step 202 where the flag I is reset, and next, the process goes to step 210 where the second combustion mode is performed.

That is, in step 210, the target fuel injection amount Q is calculated on the basis of the map shown in FIG. 16, and the fuel injection amount is set to the target fuel injection amount Q. Next, in step 211, the target opening degree ST of the throttle valve 20 is calculated on the basis of the map shown in FIG. 24A. Next, in step 112, the target opening degree SE of the EGR control valve 31 is calculated on the basis of the map shown in FIG. 24B, and the opening degree of the EGR control valve 31 is set to the target opening degree SE.

Next, in step 213, the intake air amount Ga detected by the mass flow amount detecting device 63 is taken. Next, in step 214, the actual air fuel ratio $(A/F)_R$ is calculated on the basis of the fuel injection amount Q and the intake air amount Ga. Next, in step 215, the target air fuel ratio A/F is calculated on the basis of the map shown in FIG. 23. Next, in step 216, it is determined whether or not the actual air fuel ratio $(A/F)_R$ is greater than the target air fuel ratio A/F. When the relation $(A/F)_R$>A/F is established, the process goes to step 217 where the correction value ΔST of the throttle opening degree is reduced only by the fixed value α, and then the process goes to step 219. On the contrary, when the relation $(A/F)_R$<A/F is established, the process goes to step 218 where the correction value ΔST is increased only by the fixed value α, and then the process goes to step 219. In step 219, the final target opening degree ST is calculated by adding the correction value ΔST to the target opening degree ST of the throttle valve 20, and the opening degree of the throttle valve 20 is set to the final target opening degree ST.

That is, the opening degree of the throttle valve 20 is controlled such that the actual air fuel ratio $(A/F)_R$ becomes the target air fuel ratio A/F.

As mentioned above, in the case where the second combustion mode is performed, when the required load L or the engine speed N is changed, the fuel injection amount is immediately made to coincide with the target fuel injection amount Q corresponding to the required load L and the engine speed N. For example, when the equired load L is increased, the fuel injection amount is immediately increased such hat the torque generated by the engine is immediately increased.

On the contrary, when the air fuel ratio is shifted from the target air fuel ratio A/F as the fuel injection amount Q is increased, the opening degree of the throttle valve 20 is controlled such that the air fuel ratio becomes the target air fuel ratio A/F. That is, the air fuel ratio is changed after the fuel injection amount Q is changed.

When the flag I is reset, the process goes to steps 200 and then 208 in the next process cycle, and it is determined whether or not the required load L becomes lower than the second boundary Y(N). When the relation L≧Y(N) is established, the process goes to step 210 where the second combustion mode is performed under the lean air fuel ratio.

On the contrary, in step 208, when it is determined that the relation L<Y(N), the process goes to step 209 where the flag I is set, and next, the process goes to step 203 where the low temperature combustion is performed.

Next, the description with respect to correction of the fuel injection timing to improve the engine start performance under the first combustion mode will be hereinafter explained.

On the basis of the engine speed NE calculated from the output value of the crank angle sensor 52, it is determined whether or not the relation 0≦NE<NE1 (for example, 300 rpm) is established. When the relation 0≦NE<NE1 is established, it is determined that the engine is started and the cranking is performed. Then the actual fuel injection timing is advanced with respect to the fuel injection timing calculated on the basis of the opening degree of the throttle valve 20, the opening degree of the EGR control valve 31, the fuel injection amount Q (the engine load L), the engine speed NE, the map (not shown) and the like. On the contrary, when the relation 0≦NE<NE1 is not established, it is determined whether or not the relation NE1≦NE<NE2 (for example, 350 rpm) is established. When the relation NE1≦NE<NE2 is established, it is determined that the cranking is finished and a warming up of the catalyst 25 has not been completed yet. Then the actual fuel injection timing is delayed with respect to the fuel injection timing calculated on the basis of the opening degree of the throttle valve 20, the opening degree of the EGR control valve 31, the fuel injection amount Q (the engine load L), the engine speed NE, the map (not shown) and the like. Accordingly, it is possible to complete the warming up of the catalyst 25 at the engine start time at the earlier stage where the low temperature combustion is performed. On the contrary, when the relation 0≦NE<NE2 is not established, it is determined that the cranking is finished and the warming up of the catalyst 25 is completed. Then the fuel injection timing is not changed.

Further, in the above description, it is determined on the basis of the engine speed NE whether the actual fuel injection timing is advanced or delayed. However, it is possible to perform the determination on the basis of an elapsed time after the cranking is performed. In particular, the structure can be made such that when the cranking has not been performed yet, the actual fuel injection timing is delayed. When a predetermined time has not passed yet after the cranking, the actual fuel injection timing is delayed. When the predetermined time has already passed after the cranking, the fuel injection timing is not changed.

Figure 26:
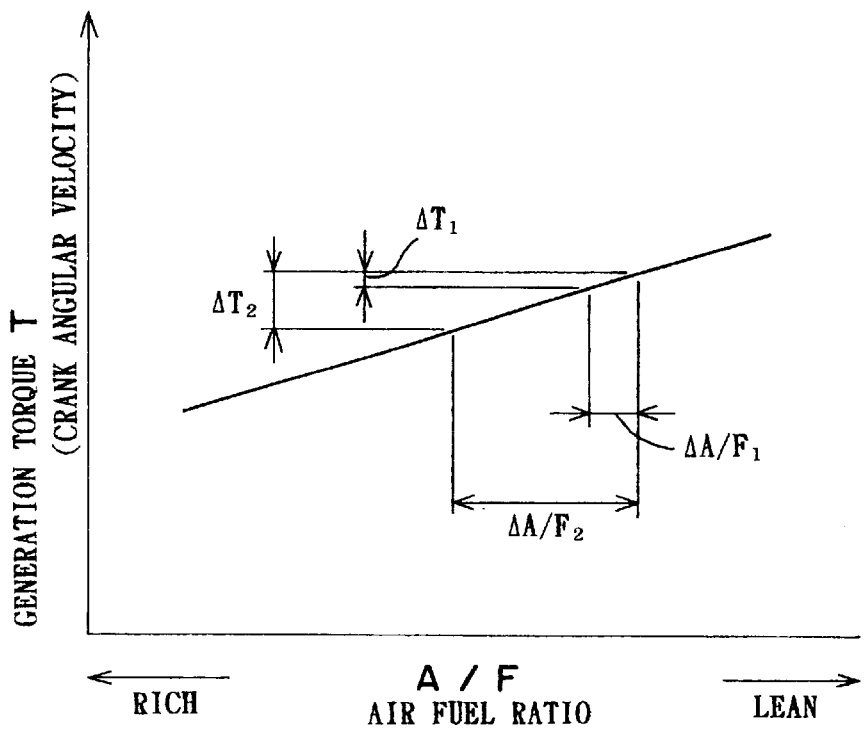
FIG. 26 is a graph which shows a relation between an air fuel ratio A/F and a generated torque T when a low temperature combustion is performed.

Here, when the first combustion mode is performed, the low temperature combustion is performed in a state where the air used for the combustion is hardly left as shown in FIG. 26. That is, when the low temperature combustion is performed, it is said that the fuel used for the combustion is slightly excessive. Accordingly, since the actually used fuel amount is not changed even when the fuel injection amount is dispersed, the dispersion $\Delta A/F_1$ of the air fuel ratio caused by the dispersion of the fuel injection amount is relatively small as shown in FIG. 26. As a result, a dispersion $\alpha T_1$ of the generated torque caused by the dispersion of the fuel injection amount is relatively small. On the contrary, when the low temperature combustion is not performed, it is said that the air used for the combustion is slightly insufficient. Accordingly, since the amount of the air actually used for the combustion is significantly changed when the intake air amount is dispersed, the dispersion $\Delta A/F_2$ of the air fuel ratio caused by the dispersion of the intake air amount becomes greater than the dispersion $\Delta A/F_1$ of the air fuel ratio caused by the dispersion of the fuel injection amount, as shown in FIG. 26. As a result, the dispersion $\Delta T_2$ of the generated torque caused by the dispersion of the intake air amount becomes greater than the dispersion $\alpha T_1$ of the generated torque caused by the dispersion of the fuel injection amount. In this case, the dispersion of the generated torque in each of the cylinders can be obtained by detecting an engine angular velocity at a stroke including an expansion stroke in each of the cylinders.

Accordingly, it is possible to accurately detect the dispersion of the intake air amount in each of the cylinders by detecting the dispersion of the intake air amount between the cylinders in the internal combustion engine, thereby being used for controlling the combustion.

The detail of the calculation will be described below.

Figure 27:
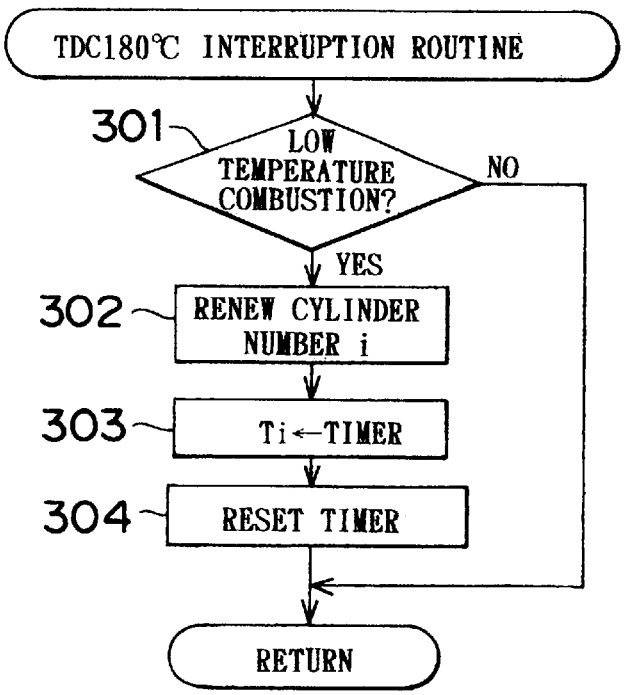
FIG. 27 is a flow chart which shows a part of a method of detecting a dispersion of an intake air amount between cylinders in the internal combustion engine.

FIG. 27 is a flow chart which shows a part of the method of detecting the dispersion of the intake air amount between the cylinders in the engine. The present routine is executed by an interruption at a timing of a top dead center at a crank angle of 180° (TDC180°CA). As shown in FIG. 27, when the present routine is started, first in step 301, it is determined whether or not the low temperature combustion is currently performed. If NO, the present routine is finished because the dispersion of the intake air amount between the cylinders can not be detected. On the contrary, if YES is determined, then in step 302, it is determined by the crank angle sensor 52 and the acceleration sensor 66 as to which cylinder is currently in the stroke including the expansion stroke, and a cylinder number 1 is renewed. Since the internal combustion engine in accordance with the present invention becomes the expansion stroke in the order of a first cylinder, a third cylinder, a fourth cylinder and a second cylinder, the cylinder number i is set to 1 (i←1) when it is determined that the cylinder in the stroke including the expansion stroke currently is the first cylinder. The cylinder number i is set to 2 (i←2) when it is determined that the cylinder in the stroke including the expansion stroke currently is the third cylinder. The cylinder number i is set to 3 (i←3) when it is determined that the cylinder in the stroke including the expansion stroke currently is the fourth cylinder. The cylinder number i is set to 4 (i←4) when it is determined that the cylinder in the stroke including the expansion stroke currently is the second cylinder.

Next in step 303, a time TIMER required for the stroke including the expansion stroke calculated on the basis of the output signal of the crank angle sensor 52 is set to a time Ti required for the stroke including the expansion stroke of the first cylinder (Ti←TIMER). Next in step 304, TIMER is reset, and a preparation for measuring the time required for the stroke including the expansion stroke of the next cylinder is made.

Next, when a time $T_1$ required for the stroke including the expansion stroke, for example, of the first cylinder is obtained while, at first, executing the present routine, a time $T_2$ required for the stroke including the expansion stroke of the third cylinder is obtained while next executing the present routine, a time $T_3$ required for the stroke including the expansion stroke of the fourth cylinder is obtained while next executing the present routine, and a time $T_4$ required for the stroke including the expansion stroke of the second cylinder is obtained while next executing the present routine.

Next, in the method of detecting the dispersion of the intake air amount between the cylinders in the internal combustion engine in accordance with the present invention, in a step (not shown), a coefficient of dispersion $Ti \times 4/(T_1+T_2+T_3+T_4)$ of the time required for the stroke including the expansion stroke of the first cylinder is calculated, which indicates the degree of dispersion of the intake air amount in the first cylinder. When the intake air amount of the first cylinder is more than an average intake air amount of all the cylinders, the dispersion coefficient becomes greater than 1, and when the intake air amount of the first cylinder is less than the average intake air amount of all the cylinders, the dispersion coefficient becomes smaller than 1.

In this case, in the present embodiment, the engine angular velocity in the stroke including the expansion stroke of each of the cylinders is obtained by detecting the time Ti required for all the strokes including the expansion stroke of each of the cylinders. However, in the other embodiment, it is possible to obtain the engine angular velocity in the stroke including the expansion stroke in each of the cylinders by detecting the time required for a part of the strokes including the expansion stroke in each of the cylinders.

Further, as mentioned above, the dispersion of the torque generated in each of the cylinders is relatively small even when the fuel injection amount is dispersed between the cylinders during the low temperature combustion. However, in order to calculate the dispersion of the intake air amount in each of the cylinders in a further accurate manner, in accordance with the other embodiment, the structure is made to correct the dispersion of the fuel injection amount supplied to each of the cylinders at a time when the second combustion mode (the combustion in accordance with the conventional combustion method) is performed before detecting the engine angular velocity in the stroke including the expansion stroke in each of the cylinders at the low temperature combustion. In accordance with this embodiment, since the dispersion of the intake air amount in each of the cylinders calculated at the low temperature combustion is not affected by the dispersion of the fuel injection amount in each of the cylinders, it is possible to calculate the dispersion of the intake air amount in each of the cylinders more accurately than in the case of not correcting the dispersion of the fuel injection amount in each of the cylinders.

In this case, in place of this embodiment, that is, in place of correcting the dispersion of the fuel injection amount in each of the cylinders under the second combustion mode, the structure can be made to use a fuel injection valve having a small dispersion of the fuel injection amount between the cylinders.

Here, in the internal combustion engine described in this embodiment, when rapidly increasing the injection amount at a time when the required load rapidly increases, the output torque of the engine is rapidly increased, causing a shock. Then, under the second combustion mode, the structure is made to gradually increase the injection amount when the required load rapidly increases so as to prevent generation of the shock.

The aforementioned shock is generated under the first combustion mode. Therefore, it is necessary to gradually increase the injection amount when the required load rapidly increases even under the first combustion mode. However, when gradually increasing the injection amount at the same speed as that in the second combustion mode under the first combustion mode, the risk of generating the misfire or smoke may occur.

That is, the first combustion mode is performed with a large amount of EGR gas, that is, a small amount of air, which is different from the second combustion mode. Accordingly, when the intake air amount is reduced with respect to the optimum air amount, that is, the air fuel ratio becomes rich with respect to the optimum air fuel ratio, the air amount becomes insufficient, thus causing misfire. On the contrary, under the first combustion mode, when the intake air amount increases more than the optimum air amount, that is, the air fuel ratio becomes lean with respect to the optimum air fuel ratio, the combustion temperature becomes high due to the active combustion, thus generating smoke. Accordingly, unlike the second combustion mode, under the first combustion mode, the delicate control of the intake air amount, that is, the air fuel ratio, is necessary.

Then, it is necessary to control the intake air amount to obtain the optimum air fuel ratio when the required load is changed and the injection amount is changed even under the first combustion mode. However, at this time, the intake air amount can not actually follow up the change of the injection amount due to the delay in the operation of the throttle valve and the like. As a result, the air fuel ratio is shifted to the rich side or the lean side with respect to the optimum air fuel ratio. In order to prevent the air fuel ratio from shifting to the rich side or the lean side as mentioned above, it is necessary to gradually change the injection amount further when the required load is changed.

Since the operation delay time of the throttle and the like is significantly long and accordingly the change speed of the injection amount is too fast even when changing the injection amount at the change speed of the injection amount for preventing the shock at this time, the air fuel ratio is shifted to the rich side or the lean side. That is, in order to prevent shifting of the air fuel ratio to the rich side or the lean side, it is necessary to gradually change the injection amount at the speed slower than the change speed of the injection amount for preventing the shock.

Accordingly, the structure can be made such that the change speed of the injection amount in the case where the required injection amount changes under the first combustion mode is set to be slower than that under the second combustion mode, thereby reducing the shock of the output torque caused by the change of the injection amount.

Further, in the internal combustion engine described in the present embodiment, in order to determine whether or not the first combustion mode is well performed, there may be provided within the combustion chamber 5 a combustion pressure sensor for detecting the pressure within the combustion chamber. An output signal of the combustion pressure sensor is connected to a peak hold circuit, and an output terminal of the peak hold circuit is connected so as to be input to the input port 45 via a corresponding AD converter 47. Since the cost is increased when the combustion pressure sensors are provided within the combustion chambers in all the cylinders, only one combustion pressure sensor may be arranged in the cylinder in which the amount of the EGR gas supplied within the combustion chamber is the largest or the EGR gas amount is the smallest.

Figure 28:
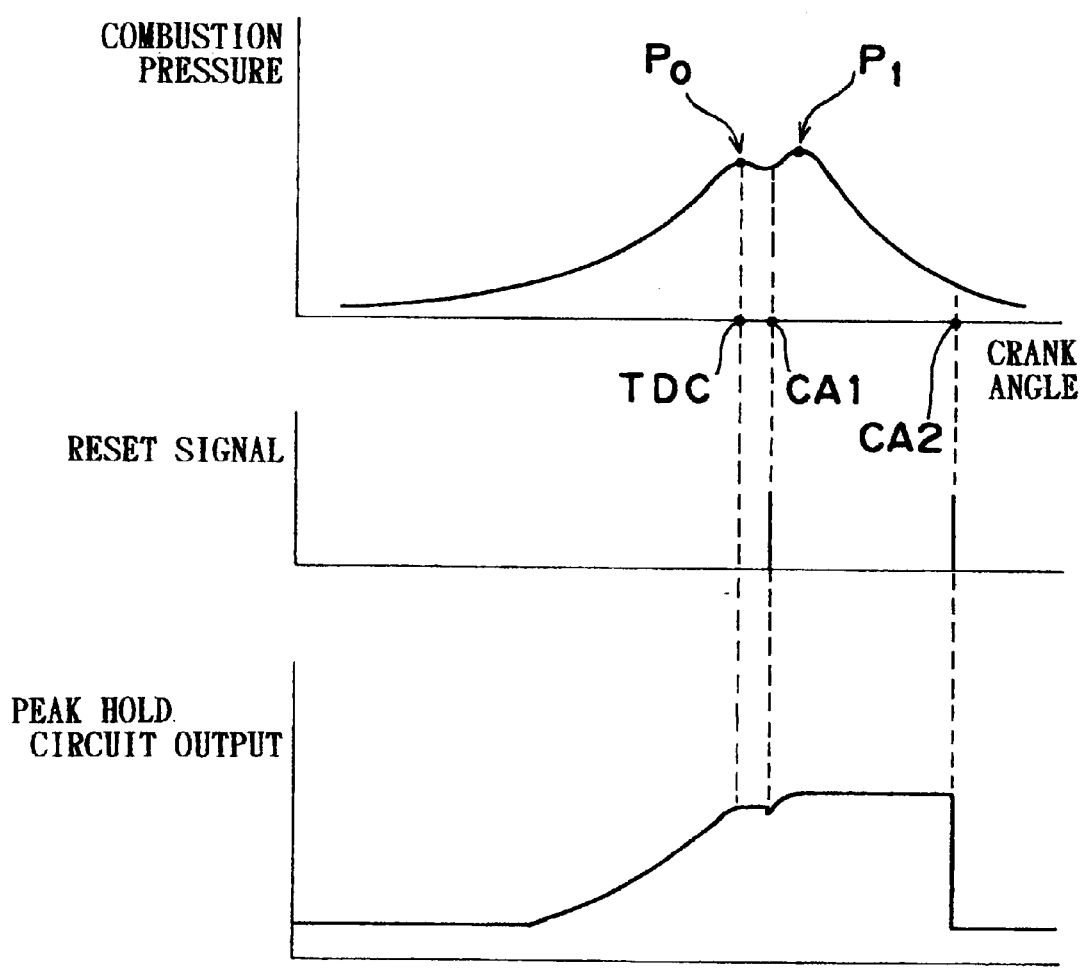
FIG. 28 is a view which shows a combustion pressure.

FIG. 28 shows one manner for determining the deficient combustion by using the combustion pressure sensor. When good combustion is performed, the combustion pressure is slowly changed. In particular, it temporarily becomes the peak at the top dead center TDC as shown by a combustion pressure $P_0$, and next, again becomes the peak after the top dead center TDC as shown by $P_1$. The peak pressure $P_1$ is generated by the combustion pressure, and the peak pressure $P_1$ becomes slightly higher than the peak pressure $P_0$ when good low temperature combustion is performed.

On the contrary, when good low temperature combustion is not performed and deficient combustion is generated, the peak pressure $P_1$ becomes lower than the peak pressure $P_0$. Accordingly, the structure is made to determine that deficient combustion has occurred when a differential pressure $\Delta P(=P_1-P_0)$ becomes negative, thus increasing the air fuel ratio. Further, the structure may be made to determine that deficient combustion has occurred when the differential pressure $\Delta P(=P_1-P_0)$ becomes negative, thus advancing the fuel injection start timing.

Further, it is possible to determine whether or not smoke is generated from the output signal of the combustion pressure sensor, or whether or not noise equal to or more than a fixed level is generated.

When an area having a high density of fuel particles is locally formed and, as a result, a pressure increase amount after ignition becomes large, the combustion temperature becomes high. At this time, the low temperature combustion is not performed, and a large amount of smoke is generated. Accordingly, the structure may be made to determine that smoke is generated when the differential pressure $\Delta P(=P_1-P_0)$ exceeds a predetermined upper limit value. Then the injection timing can be delayed such that the differential pressure $\Delta P$ becomes small.

Figure 29:
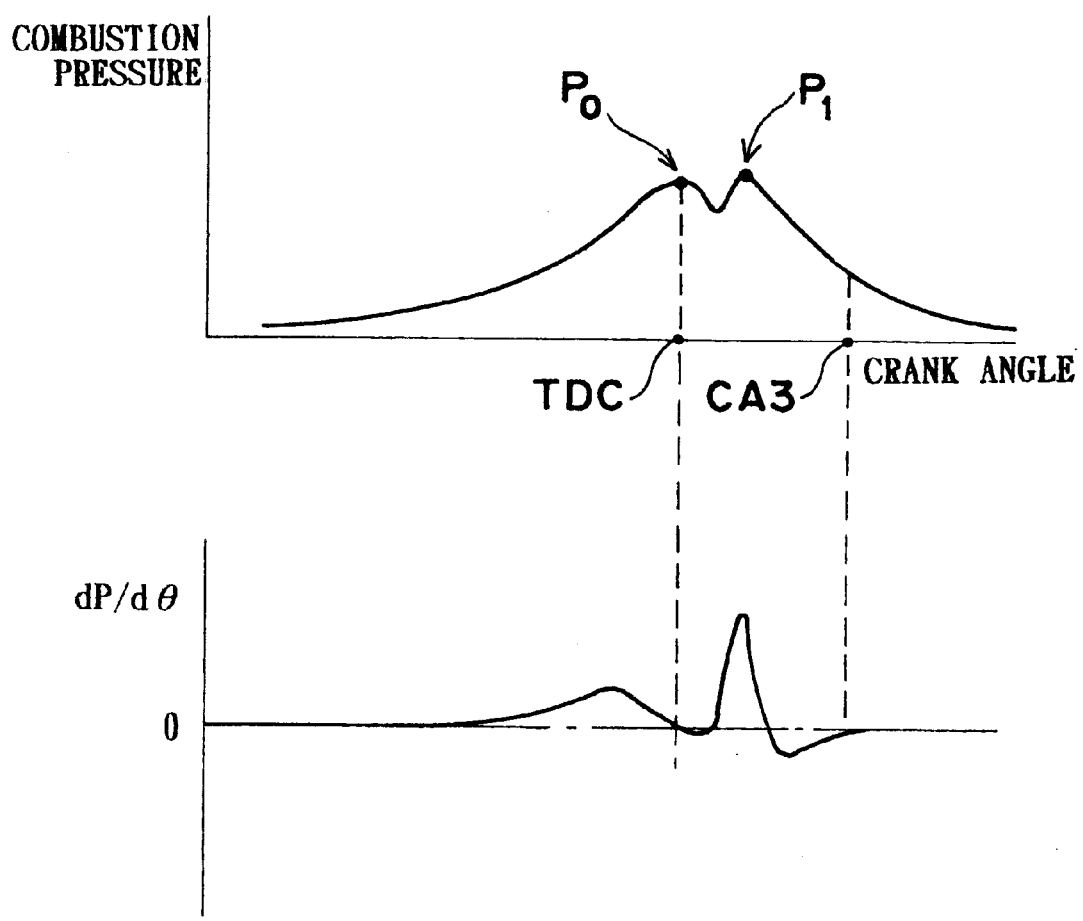
FIG. 29 is a view which shows the combustion pressure and a pressure change rate dP/dθ of the combustion pressure.

Next in order to determine on the basis of the combustion pressure whether or not noise equal to or more than the fixed level is generated, as shown by FIG. 29, the combustion pressure $P_1$ does not become very large in comparison with $P_0$. Then smoke is not generated, however, noise becomes high in the case where a pressure change rate $dP/d\theta$ of the combustion pressure per a unit crank angle $d\theta$ becomes high as the combustion is rapidly started after the compression top dead center (TDC). Such a change of the combustion pressure is generated in the case where the air fuel ratio becomes too lean.

Accordingly, the structure may be made to delay the injection start timing for the purpose of lowering the noise to the fixed level when the pressure change rate $dP/d\theta$ exceeds an allowable upper limit value after the compression top dead center (TDC).

In the illustrated embodiment, the engine controller (control unit 40) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 19, 20, 25 and/or 27 can be used as the controller. A distributed processing architecture can be used for maximum data/signal processing capability and speed.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An internal combustion engine in which a generation amount of soot increases to a peak amount when increasing an amount of an inert gas supplied to a combustion chamber, the engine comprising at least one said combustion chamber and an engine control system that:
    controls an amount of an intake air supplied to the combustion chamber;
    controls an amount of an inert gas so as to make the amount of the inert gas supplied to the combustion chamber more than an amount of the inert gas that causes the generation amount of soot to become the peak amount;
    determines an injection amount and a timing for injecting a fuel to the combustion chamber in accordance with an operation state of the engine;
    adjusts the fuel injection timing when the fuel injection amount is changed by quickening the fuel injection timing when the fuel injection amount is increased, and by delaying the fuel injection timing when the fuel injection amount is reduced;
    said control system selectively switches between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount.

2. An internal combustion engine according to claim 1, wherein the control system adjusts the fuel injection timing by quickening the fuel injection timing by advancing a predetermined crank angle when the fuel injection amount is increased.

3. An internal combustion engine according to claim 1, wherein the control system adjusts the fuel injection timing by delaying the fuel injection timing by a fixed crank angle when the fuel injection amount is reduced.

4. An internal combustion engine according to claim 1, further comprising a memory that stores standard injection timing data in accordance with a required load and an engine speed, wherein said control system determines the fuel injection timing based on the standard injection timing data.

5. An internal combustion engine according to claim 4, further comprising a detector that detects a value of an operation parameter of the engine which influences a temperature of the fuel and a surrounding gas during combustion within the combustion chamber, wherein said control system determines the fuel injection timing by correcting the standard injection timing data in accordance with the detected value of the operation parameter.

6. An internal combustion engine according to claim 5, wherein the operation parameter is an air fuel ratio, and the standard injection timing data is delayed as the air fuel ratio is increased.

7. An internal combustion engine according to claim 5, further comprising a recirculation device that recirculates an exhaust gas discharged from the combustion chamber into an engine intake passage, wherein said operation parameter is an exhaust gas recirculation rate and the standard injection timing data is quickened as the detected exhaust gas recirculation rate is increased.

8. An internal combustion engine according to claim 5, wherein said operation parameter is a temperature of an intake gas supplied to the combustion chamber and the standard injection timing data is delayed as the detected temperature of the intake gas is increased.

9. An internal combustion engine according to claim 5, wherein said operation parameter is a pressure within the intake passage and the standard injection timing data is delayed as the detected pressure within the intake passage is increased.

10. An internal combustion engine according to claim 5, wherein said operation parameter is a temperature of an engine cooling water and the standard injection timing data is delayed as the detected temperature of the engine cooling water is increased.

11. An internal combustion engine according to claim 5, wherein said operation parameter is a humidity of an intake air and the standard injection timing data is quickened as the detected humidity of the intake air is increased.

12. An internal combustion engine according to claim 1, further comprising a recirculation device that recirculates an exhaust gas discharged from the combustion chamber, wherein said inert gas includes the recirculated exhaust gas, and wherein an exhaust gas recirculation rate is approximately 55% or greater.

13. An internal combustion engine according to claim 1, wherein a catalyst having an oxidation function is arranged within the engine exhaust gas passage.

14. An internal combustion engine according to claim 1, further comprising:
    a combustion pressure sensor for detecting the combustion pressure within the combustion chamber; and wherein
    the control system determines, based on the combustion pressure detected by the combustion pressure sensor, whether or not a smoke or a noise equal to or more than a fixed level is generated, or whether or not a deficient combustion is generated,
    wherein the fuel injection timing is delayed or the air fuel ratio is reduced when it is determined that smoke or the noise equal to or more than the fixed level is generated, and the fuel injection timing is quickened or the air fuel ratio is raised when it is determined that the deficient combustion is generated.

15. An internal combustion engine in which a generation amount of soot increases to a peak amount when increasing an amount of an inert gas supplied to a combustion chamber, the engine comprising at least one said combustion chamber and an engine control system that: controls an amount of an intake air supplied to the combustion chamber;
- controls an amount of an inert gas so as to make the amount of the inert gas supplied to the combustion chamber more than an amount of the inert gas that causes the generation amount of soot to become the peak amount;
- determines an injection amount and a timing for injecting a fuel to the combustion chamber in accordance with an operation state of the engine;
- adjusts the fuel injection timing when the fuel injection amount is changed;
- said control system selectively switches between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount;
- said control system also controls an amount of an intake gas supplied to the combustion chamber; and further comprising:
  - a detector that detects an amount of an intake air supplied to the combustion chamber,
  - wherein the intake gas amount is controlled based on the required load and the engine speed, and the fuel injection amount is controlled based on the intake air amount detected by the detector during the first combustion mode.

16. An internal combustion engine according to claim 15, wherein, at start of the engine, the control system performs the first combustion mode.

17. An internal combustion engine according to claim 16, wherein, from a cranking of an engine at the start thereof to warm up of a catalyst having an oxidation function and arranged within the engine exhaust passage, the fuel injection timing is adjusted to be delayed by retarding a crank angle.

18. An internal combustion engine in which a generation amount of soot increases to a peak amount when increasing an amount of an inert gas supplied to a combustion chamber, the engine comprising at least one said combustion chamber and an engine control system that:
- controls an amount of an intake air supplied to the combustion chamber;
- controls an amount of an inert gas so as to make the amount of the inert gas supplied to the combustion chamber more than an amount of the inert gas that causes the generation amount of soot to become the peak amount;
- determines an injection amount and a timing for injecting a fuel to the combustion chamber in accordance with an operation state of the engine;
- adjusts the fuel injection timing when the fuel injection amount is changed;
- said control system selectively switches between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount;

wherein, at start of the engine, the engine control system performs the first combustion mode, and in a cranking state of the engine at the start of the engine, the fuel injection timing is adjusted by advancing a crank angle.

19. An engine controller for use with an internal combustion engine in which a generation amount of soot increases to a peak amount when increasing an amount of an inert gas supplied to a combustion chamber, wherein the engine controller:
- determines an amount of an intake air supplied to the combustion chamber;
- determines an amount of an inert gas so as to make the amount of the inert gas supplied to the combustion chamber more than an amount of the inert gas that causes the generation amount of soot to become the peak amount;
- determines an injection amount and a timing for injecting a fuel to the combustion chamber in accordance with an operation state of the engine;
- adjusts the fuel injection timing when the fuel injection amount is changed by quickening the fuel injection timing when the fuel injection amount is increased and by delaying the fuel injection timing when the fuel injection amount is reduced; and
- selectively switches between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount.

20. An engine controller according to claim 19, wherein the controller adjusts the fuel injection timing by quickening the fuel injection timing by advancing a predetermined crank angle when the fuel injection amount is increased.

21. An engine controller according to claim 19, wherein the controller adjusts the fuel injection timing by delaying the fuel injection timing by a fixed crank angle when the fuel injection amount is reduced.

22. An engine controller according to claim 19, wherein the controller includes a memory that stores standard injection timing data in accordance with a required load and an engine speed, and said controller determines the fuel injection timing based on the standard injection timing data.

23. An engine controller according to claim 22, wherein the controller receives a signal indicative of a value of an operation parameter of the engine which influences a temperature of the fuel and a surrounding gas during combustion within the combustion chamber, and the controller determines the fuel injection timing by correcting the standard injection timing data in accordance with the detected value of the operation parameter.

24. An engine controller according to claim 19, wherein said inert gas includes recirculated exhaust gas that is recirculated by a recirculation device that recirculates an exhaust gas discharged from the combustion chamber, and wherein an exhaust gas recirculation rate is approximately 55% or greater.

25. An engine controller according to claim 19, wherein the controller determines, based on a combustion pressure detected by a combustion pressure sensor that detects the combustion pressure within the combustion chamber; whether or not a smoke or a noise equal to or more than a fixed level is generated, or whether or not a deficient combustion is generated, said controller:

delaying a fuel injection timing or reducing the air fuel ratio when it is determined that smoke or the noise equal to or more than the fixed level is generated, and quickening the fuel injection timing or raising the air fuel ratio when it is determined that the deficient combustion is generated.

26. An engine controller for use with an internal combustion engine in which a generation amount of soot increases to a peak amount when increasing an amount of an inert gas supplied to a combustion chamber, wherein the engine controller:

determines an amount of an intake air supplied to the combustion chamber;

determines an amount of an inert gas so as to make the amount of the inert gas supplied to the combustion chamber more than an amount of the inert gas that causes the generation amount of soot to become the peak amount;

determines an injection amount and a timing for injecting a fuel to the combustion chamber in accordance with an operation state of the engine;

adjusts the fuel injection timing when the fuel injection amount is changed;

selectively switches between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount; and determines an amount of an intake gas supplied to the combustion chamber; and the intake gas amount is determined based on the required load and the engine speed, and the fuel injection amount is determined based on a detected intake air amount detected by a detector during the first combustion mode, the detector detecting an amount of an intake air supplied to the combustion chamber.

27. An engine control method for use with an internal combustion engine in which a generation amount of soot increases to a peak amount when increasing an amount of an inert gas supplied to a combustion chamber, the method comprising:

determining an amount of an intake air supplied to the combustion chamber;

determining an amount of an inert gas so as to make the amount of the inert gas supplied to the combustion chamber more than an amount of the inert gas that causes the generation amount of soot to become the peak amount;

determining an injection amount and a timing for injecting a fuel to the combustion chamber in accordance with an operation state of the engine;

adjusting the fuel injection timing when the fuel injection amount is changed by quickening the fuel injection timing when the fuel injection amount is increased and by delaying the fuel injection timing when the fuel injection amount is reduced; and selectively switching between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount.

28. A method according to claim 27, wherein the adjusting step adjusts the fuel injection timing by quickening the fuel injection timing by advancing a predetermined crank angle when the fuel injection amount is increased.

29. A method according to claim 27, wherein the adjusting step adjusts the fuel injection timing by delaying the fuel injection timing by a fixed crank angle when the fuel injection amount is reduced.

30. A method according to claim 27, further comprising storing standard injection timing data in accordance with a required load and an engine speed in a memory, and wherein the fuel injection timing is determined based on the standard injection timing data.

31. A method according to claim 30, further comprising receiving a signal indicative of a value of an operation parameter of the engine which influences a temperature of the fuel and a surrounding gas during combustion within the combustion chamber, and wherein the fuel injection timing is determined by correcting the standard injection timing data in accordance with the detected value of the operation parameter.

32. A method according to claim 27, wherein said inert gas includes recirculated exhaust gas that is recirculated by a recirculation device that recirculates an exhaust gas discharged from the combustion chamber, and wherein an exhaust gas recirculation rate is approximately 55% or greater.

33. A method according to claim 27, further comprising determining, based on a combustion pressure detected by a combustion pressure sensor that detects the combustion pressure within the combustion chamber; whether or not a smoke or a noise equal to or more than a fixed level is generated, or whether or not a deficient combustion is generated, and:

delaying a fuel injection timing or reducing the air fuel ratio when it is determined that smoke or the noise equal to or more than the fixed level is generated, and quickening the fuel injection timing or raising the air fuel ratio when it is determined that the deficient combustion is generated.

34. An engine control method for use with an internal combustion engine in which a generation amount of soot increases to a peak amount when increasing an amount of an inert gas supplied to a combustion chamber, the method comprising:

determining an amount of an intake air supplied to the combustion chamber;

determining an amount of an inert gas so as to make the amount of the inert gas supplied to the combustion chamber more than an amount of the inert gas that causes the generation amount of soot to become the peak amount;

determining an injection amount and a timing for injecting a fuel to the combustion chamber in accordance with an operation state of the engine;

adjusting the fuel injection timing when the fuel injection amount is changed;

selectively switching between a first combustion mode in which an amount of the inert gas supplied to the combustion chamber is more than the amount of the inert gas that causes the generation amount of soot to become the peak amount and in which substantially no soot is generated, and a second combustion mode in which an amount of the inert gas supplied to the combustion chamber is smaller than the amount of the inert gas that causes the generation amount of soot to become the peak amount; and determining an amount of an intake gas supplied to the combustion chamber based on the required load and the engine speed, and the fuel injection amount is determined based on a detected intake air amount detected by a detector during the first combustion mode, the detector detecting an amount of an intake air supplied to the combustion chamber.

* * * * *